US011138573B2

(12) United States Patent
Sato

(10) Patent No.: US 11,138,573 B2
(45) Date of Patent: Oct. 5, 2021

(54) ELECTRONIC MONEY TRANSFER PAYMENT METHOD AND SYSTEM FOR SAME

(71) Applicant: ISI CORPORATION, Tokyo (JP)

(72) Inventor: Motonori Sato, Tokyo (JP)

(73) Assignee: ISI CORPORATION, Tokyo (JP)

( * ) Notice: Subject to any disclaimer, the term of this patent is extended or adjusted under 35 U.S.C. 154(b) by 1154 days.

(21) Appl. No.: 14/353,678

(22) PCT Filed: Oct. 11, 2012

(86) PCT No.: PCT/JP2012/076344
§ 371 (c)(1),
(2) Date: Jul. 17, 2014

(87) PCT Pub. No.: WO2013/061792
PCT Pub. Date: May 2, 2013

(65) Prior Publication Data
US 2014/0344161 A1    Nov. 20, 2014

(30) Foreign Application Priority Data

Oct. 25, 2011  (JP) .............................. JP2011-233596

(51) Int. Cl.
*G06Q 20/10* (2012.01)
*G06Q 20/06* (2012.01)
(Continued)

(52) U.S. Cl.
CPC ........... *G06Q 20/10* (2013.01); *G06Q 20/065* (2013.01); *G06Q 20/0658* (2013.01);
(Continued)

(58) Field of Classification Search
CPC .. G06Q 20/10; G06Q 20/0658; G06Q 20/367; G06Q 20/105; G06Q 20/065; G06Q 20/3223; G06Q 20/38215; G06Q 2220/00
See application file for complete search history.

(56) References Cited

U.S. PATENT DOCUMENTS 5,453,601 A * 9/1995 Rosen .................... G06Q 20/04
                                                        705/65
5,721,781 A * 2/1998 Deo ...................... G06Q 20/341
                                                        705/67
(Continued)

FOREIGN PATENT DOCUMENTS

JP        10-124597 A    5/1998
JP     2006-048360 A    2/2006
(Continued)

OTHER PUBLICATIONS

G. Me and M. A. Strangio, "EC-PAY: An Efficient and Secure ECC-Based Wireless Local Payment Scheme," Third International Conference on Information Technology and Applications (ICITA'05), 2005, pp. 442-447, doi: 10.1109/ICITA.2005.122. (Year: 2005).*

*Primary Examiner* — Patrick McAtee
*Assistant Examiner* — Eduardo D Castilho
(74) *Attorney, Agent, or Firm* — Taro Yaguchi

(57) ABSTRACT

This electronic money transfer system provides an electronic money transfer method and a system for the same which allow handling electronic money in a sense that is very similar to cash, and which allow avoidance of loss of the electronic money even at a time of loss or theft of a terminal for operating the electronic money. To this end, first, information of an electronic certificate for a terminal (A) of a user A is sent from a terminal (B) of a user B to an electronic money management server (300), and information of the electronic certificate for the terminal (B) is sent from the terminal (A) to the electronic money management server
(Continued)

(300). Thus, the terminals to perform the transaction are authenticated. Then, requests for a payment/receipt of electronic money is sent from the terminal (A) and the terminal (B) to the electronic money management server (300), based on which requests, the electronic money is transferred from the account of the user (A) to the account of the user (B) within the electronic money management server (300).

16 Claims, 22 Drawing Sheets

(51) Int. Cl.
    *G06Q 20/36*     (2012.01)
    *G06Q 20/32*     (2012.01)
    *G06Q 20/38*     (2012.01)

(52) U.S. Cl.
    CPC ....... *G06Q 20/105* (2013.01); *G06Q 20/3223* (2013.01); *G06Q 20/367* (2013.01); *G06Q 20/38215* (2013.01); *G06Q 2220/00* (2013.01)

(56) References Cited

U.S. PATENT DOCUMENTS

| | | | | |
|---|---|---|---|---|
| 5,903,721 | A * | 5/1999 | Sixtus | G06Q 20/02 |
| | | | | 726/2 |
| 6,105,006 | A * | 8/2000 | Davis | G06Q 20/32 |
| | | | | 705/35 |
| 7,093,130 | B1 * | 8/2006 | Kobayashi | G06Q 20/3821 |
| | | | | 705/67 |
| 7,266,533 | B2 * | 9/2007 | Karas | G06Q 20/02 |
| | | | | 705/26.35 |
| 8,374,962 | B2 * | 2/2013 | Abelman | G06Q 20/04 |
| | | | | 705/44 |
| 8,706,627 | B2 * | 4/2014 | Shore | G06Q 20/202 |
| | | | | 705/41 |
| 2003/0070080 | A1 * | 4/2003 | Rosen | G06Q 20/06 |
| | | | | 713/187 |
| 2003/0220863 | A1 * | 11/2003 | Holm | G06Q 20/04 |
| | | | | 705/37 |
| 2004/0098226 | A1 * | 5/2004 | Odachi | H04L 12/14 |
| | | | | 702/182 |
| 2004/0148254 | A1 * | 7/2004 | Hauser | G06Q 20/12 |
| | | | | 705/39 |
| 2004/0243517 | A1 * | 12/2004 | Hansen | G06Q 20/382 |
| | | | | 705/64 |
| 2005/0209961 | A1 * | 9/2005 | Michelsen | G06Q 40/02 |
| | | | | 705/39 |
| 2007/0265984 | A1 * | 11/2007 | Santhana | G06Q 20/223 |
| | | | | 705/65 |
| 2008/0028208 | A1 * | 1/2008 | Bolcer | G06F 21/10 |
| | | | | 713/156 |
| 2008/0093438 | A1 * | 4/2008 | Berntsen | G06Q 20/327 |
| | | | | 235/379 |
| 2008/0222711 | A1 * | 9/2008 | Michaelis | G07C 9/23 |
| | | | | 726/7 |
| 2008/0229104 | A1 * | 9/2008 | Ju | H04L 9/3273 |
| | | | | 713/169 |
| 2009/0132415 | A1 * | 5/2009 | Davis | G06Q 20/10 |
| | | | | 705/43 |
| 2009/0132813 | A1 * | 5/2009 | Schibuk | G06Q 20/322 |
| | | | | 713/158 |
| 2009/0192937 | A1 | 7/2009 | Griffin et al. | |
| 2010/0078476 | A1 * | 4/2010 | Ben-Zvi | G06Q 20/349 |
| | | | | 235/380 |
| 2010/0125510 | A1 | 5/2010 | Smith et al. | |
| 2011/0099367 | A1 * | 4/2011 | Thom | G06F 21/72 |
| | | | | 713/156 |
| 2011/0191196 | A1 * | 8/2011 | Orr | G06Q 20/202 |
| | | | | 705/17 |
| 2011/0246284 | A1 * | 10/2011 | Chaikin | G06Q 20/204 |
| | | | | 705/14.38 |
| 2012/0166338 | A1 * | 6/2012 | Agnelli | G06Q 20/40 |
| | | | | 705/44 |

FOREIGN PATENT DOCUMENTS

| | | |
|---|---|---|
| JP | 2006-221462 A | 8/2006 |
| JP | 2006-244151 A | 9/2006 |
| JP | 2007-172358 A | 7/2007 |
| JP | 2007-316835 A | 12/2007 |
| JP | 2008-264529 A | 11/2008 |
| JP | 2009-151737 A | 7/2009 |
| JP | 2011-081498 A | 4/2011 |
| WO | 2010-056480 A1 | 5/2010 |

* cited by examiner

| Customer Full Name, Name & Nick Name | E-Mail Address | Answer to a Question | Login ID | Password | Electronic Certificate Number | Terminal Individual Information | Electronic Money Account Number Account (1) | Electronic Money Account Number Account (2) |
|---|---|---|---|---|---|---|---|---|
| User A | abc@··· | ice cream | 123456 | aie··· | 123456-1 | ID123··· | 1234-2··· | 1234-3··· |
| User B | bbc@··· | saury | 122334 | sab··· | 122334-1 | NE122··· | 1223-3··· | |

FIG. 5

| Card number: | 1234-2345-3456-5678 | | | |
|---|---|---|---|---|
| Date and Time | Type | Amount of Money | Card Number of the Other Party | Balance |
| 2011/6/6 | New Purchase | 3,000 | — | 3,000 |
| 2011/6/6 | Remittance | 300 | 1223-3··· | 2,700 |
| 2011/6/6 | Money Receipt | 1,000 | 5555-5··· | 3,700 |
| | | | | |

FIG. 6

☐ Which card amount would like?
　○ ¥1000　　◉ ¥3000　　○ ¥5000　　○ ¥10000

☐ Which card design would you like?

① ② ③
　④ ⑤ ⑥

☐ Please enter a name for your card.
　[ Pocket money ]

☐ Please select a payment method.
　◉ Credit card　　○ Convenience Store Settlement
　○ Internet Banking

[ Purchase ]　　　—130

Benefit Table

| Provider | Contents | | Qualifications | | | Conditions for Distribution | | | Remarks |
|---|---|---|---|---|---|---|---|---|---|
| | Benefit Type | Amount | Condition 1 | Condition 2 | Valid period | Age and Gender | Number of Historical Transactions | Geographical Area | |
| User B | Cash rebate | 200 yen | Payment of 2000 yen or more | Should not be combined with other benefits | 2012/9/1 ~2012/9/30 | 20-29, Male | 3 or more | Near Department Store a | |
| User B | Cash rebate | 500 yen | Payment of 5000 yen or more | Should not be combined with other benefits | 2012/9/1 ~2012/9/30 | 20-29, Male | 3 or more | Near Department Store a | |
| User C | Parking discount | 400 yen | Payment of 2000 yen or more | Should not be combined with other benefits | 2012/9/10 ~2012/9/10 | 21-100, Male & Female | 0 or more | Near Department Store a | Partnering with Department Store a Parking |
| User C | Cash rebate | 200 yen | Payment of 2000 yen or more | Should not be combined with other benefits | 2012/9/10 ~2012/9/10 | 21-100, Male & Female | 0 or more | Near Department Store a | |
| User D | Discount applied next time | 20% | Payment of 2000 yen or more | Should not be combined with other benefits | 2012/9/1 ~2012/9/30 | 21-100, Male & Female | 0 or more | Near Station b | |

ELECTRONIC MONEY TRANSFER PAYMENT METHOD AND SYSTEM FOR SAME

FIELD OF THE INVENTION

The present invention relates to an electronic money transfer method and a system for the same for sending electronic money owned by a first user to a second user, by using a terminal of the first user and a terminal of the second user.

BACKGROUND OF THE INVENTION

In recent years, contactless IC cards, portable terminals and the like each having an embedded IC chip therein have been widely used. Examples of IC chip-embedded contactless IC cards include ones used at ticket gates and/or car entrances for trains and busses, and each IC chip in the IC card has electronic money stored therein in advance. When this IC card approaches a dedicated reader/writer at a ticket gate or an entrance, electromagnetic waves from the reader/writer supplies an electric current into the IC chip of the IC card, and also sends signals to the IC chip of the IC card for, for example, requesting monetary payment for the fare. In the meantime, the IC chip operates with the supplied electric power to receive the signals from the reader/writer, deduct the fare amount from a balance of the electronic money stored in the IC chip, and send signals back to the reader/writer for making the fare payment. Then, the reader/writer receives the signals from the IC card, and communicates with a center or the like for managing the electronic money of this IC card to thereby complete the fare settlement. In the step for completing this settlement, actual cash will be transferred from a company which issued the electronic money to a railway or bus company. In this manner, the IC chip of the IC card has electronic money stored therein in advance, and the IC chip itself retains the electronic money (monetary value).

On the other hand, portable terminals each having an embedded IC chip therein are also adapted to store electronic money in the IC chip, enabling fare payments when their users get on or off a train or a buss via the above-mentioned reader/writer as with the IC card.

Also, if a portable terminal is embedded with an IC chip, the portable terminal may access the IC chip via application software (hereafter, referred to as an "application") of the portable terminal to thereby make a purchase on the Internet, for example, through the application. In one example of Internet shopping processing using the portable terminal application, first the application accesses an Internet shopping site enabled for the Edy® electronic money, and makes a preliminary request for a settlement using the electronic money stored in the IC chip of the portable terminal. Then, the shopping site accepts the preliminary request for the settlement, and sends an actual settlement request for the preliminary request to an Edy center (which manages the electronic money). The Edy center causes the mobile p hone to display a settlement confirmation e-mail based on the actual settlement request, and requests an input on whether or not the settlement is allowed. If the input to the portable terminal instructs to allow the settlement, the application deducts an amount of the electronic money for the settlement from the IC chip, and notifies the Edy center that the settlement is allowed. Upon receipt of signals from the mobile terminal for allowing the settlement, the Edy center processes an actual monetary payment to the shopping site via a bank or the like as well as notifying the shopping site and the portable terminal that the settlement has been completed. Also, the shopping site causes the portable terminal application to, among others, display that the settlement has been completed. Thus, it is again required that the IC chip itself retains electronic money (monetary value) even for the case of Internet shopping using a portable terminal with an embedded IC chip.

On the other hand, settlements which do not use electronic money include ones using a credit card or a debit card (a bank ATM card enable to function as a debit card). For example, when performing a settlement at a debit card-enabled store, the user first hands over the user's debit card to the store clerk, and the store clerk uses a dedicated reader, connected to a POS terminal, to read the debit card. Also, a debit card owner enters a personal identification number (PIN number) into a dedicated device connected to a POS terminal. The POS terminal sends card information read by the reader, an amount of money for the settlement and the PIN number to a server of a bank which issued the card. If the bank server obtains an "OK" result from a query on the card information, and determines that an account corresponding to the card information has the amount of money for the settlement, the bank server immediately withdraws the amount of money for the settlement from the account, and performs processing for transferring the amount from the bank to the store. Also, a notification such as the completion of the withdrawal from the account is sent to the store to thereby complete the settlement using the debit card.

The methods of performing settlements using an IC card, a portable terminal with an IC chip and a debit card are described in JP-A-2009-151737, JP-A-2006-048360, JP-A-2008-264529 and the like.

Note that the debit cards handle actual cash, whereas the IC cards and/or the portable terminals with the IC chip handle electronic money.

Here, since the debit cards handle actual cash, and are used to withdraw cash directly from their respective bank accounts, if the card information or the PIN number is stolen and maliciously exploited, the cash in the bank account may disappear, causing undesirable consequences to other withdraws, or the stolen cash may not be refunded, leading to further damage.

On the other hand, since the IC cards and/or the portable terminals with the IC chip handle electronic money, it can be said that they are safer than the debit cards in such a way that even if the IC cards and/or the portable terminals are stolen with malicious intent, amounts of damage caused are limited. Also, since the IC cards and/or the portable terminals with the IC chip have electronic money (monetary value) stored in their respective IC chips themselves, again it can be said that the IC cards and/or the portable terminals are safer than the debit cards in such a way that one has to steal the IC cards and/or the portable terminals to exploit their electronic money.

However, if the IC cards and/or the portable terminals with the IC chip are lost or stolen, it means that the electronic money in their respective IC chip will be lost or stolen as well. For this reason, if the IC cards and/or the portable terminals are lost or stolen, the electronic money in their respective IC chip may not be collected without collecting the IC cards and/or the portable terminals themselves although their usage may be restricted by contacting a company which issued the IC card or the like.

Whereas, whether or not a payment can be made at a store using a portable terminal with an IC chip mainly depends on whether or not the store has a POS terminal equipped with a reader/writer enabled for a settlement system using the electronic money. Also, when a payment in electronic money is made using a portable terminal with an IC chip at a store's POS terminal, an amount of the electronic money for the payment is deducted from the IC chip of the portable terminal, and information on the electronic money, unique information stored in the IC chip, unique information stored in the POS terminal and the like are sent to a center for managing the electronic money. Then, upon confirming that the settlement has no problem, the center performs processing for paying actual cash to the store, and thereby the payment from an owner of the portable terminal to the store is regarded as complete.

As described above, payments in electronic money using the IC cards and/or the portable terminals with the IC chip may appear to be payments by electronic money, but in reality, they have cash payments underneath and the electronic money is not completely used as cash substitute.

SUMMARY OF THE INVENTION

In order to overcome above challenges, the purpose of the present invention is to provide an electronic money transfer method and a system for the same which allow handling electronic money in a sense that is very similar to handling cash, and which allow avoidance of loss of the electronic money even at a time of loss or theft of a terminal for operating the electronic money.

To this end, according to a principal aspect of the present invention, there is provided a method of transferring electronic money from a first user to a second user by using a first user terminal owned by the first user, a second user terminal owned by the second user, and an electronic money management server, wherein the electronic money management server is in communication with the first user terminal and the second user terminal through a communication line, and stores electronic money of the first user and electronic money of the second user, wherein the electronic money management server and the first user terminal store a first electronic certificate associated with first user information and/or the first user terminal, whereas the electronic money management server and the second user terminal store a second electronic certificate associated with second user information and/or the second user terminal, the method comprising: a first receiving step, wherein the first user terminal receives at least part of the second electronic certificate information from the second user terminal via near field communication or the communication line, and stores the at least part of the second electronic certificate information in a memory of the first user terminal; a second receiving step, wherein the second user terminal receives at least part of the first electronic certificate information from the first user terminal via the near field communication or the communication line, and stores the at least part of the first electronic certificate information in a memory of the second user terminal; a third receiving step, wherein the electronic money management server receives the at least part of the second electronic certificate information from the first user terminal, and receives the at least part of the first electronic certificate information from the second user terminal after the first receiving step and the second receiving step; a authentication step, wherein the electronic money management server authenticates the first user terminal and the second user terminal by determining at least whether or not the at least part of the second electronic certificate information received from the first user terminal corresponds with second electronic certificate information stored in the electronic money management server, and whether or not at least part of the first electronic certificate information received from the second user terminal corresponds with first electronic certificate information stored in the electronic money management server; a access key transmission step, wherein an access key is sent to each of the first user terminal and the second user terminal after the first user terminal and the second user terminal are authenticated in the authentication step; a fourth receiving step, wherein the electronic money management server receives from the first user terminal, the access key and an instruction to transfer the electronic money to the second user terminal, and from the second user terminal, the access key, an instruction to receive the electronic money from the first user terminal, and an amount to be received; a settlement determination step after the fourth receiving step, wherein the electronic money management server determines at least whether or not the access key received from the first user terminal and the access key received from the second user terminal correspond with each other, and whether or not the amount to be received is within a balance of the first user's electronic money stored in the electronic money management server; and a settlement step, wherein the balance of the first user's electronic money in the electronic money management server is reduced by the amount to be received, and a balance of the second user's electronic money in the electronic money management server is increased by the amount to be received if it is determined in the settlement determination step that the access keys correspond with each other, and that the amount to be received is within the balance of the first user's electronic money.

According to another principal aspect of the present invention, there is provided a method of transferring electronic money from a first user to a second user by using a first user terminal owned by the first user, a second user terminal owned by the second user, and an electronic money management server, wherein the electronic money management server is in communication with the first user terminal and the second user terminal through a communication line, and stores electronic money of the first user and electronic money of the second user, wherein the electronic money management server and the first user terminal store a first electronic certificate associated with first user information and/or the first user terminal, whereas the electronic money management server and the second user terminal store a second electronic certificate associated with second user information and/or the second user terminal, the method comprising: a first receiving step, wherein the first user terminal receives at least part of the second electronic certificate information from the second user terminal via near field communication or the communication line, and stores the at least part of the second electronic certificate information in a memory of the first user terminal; a second receiving step, wherein the second user terminal receives at least part of the first electronic certificate information from the first user terminal via the near field communication or the communication line, and stores the at least part of the first electronic certificate information in a memory of the second user terminal; a third receiving step, wherein the electronic money management server receives the at least part of the second electronic certificate information from the first user terminal, and receives the at least part of the first electronic certificate information from the second user terminal after the first receiving step and the second receiving step; a authentication step, wherein the electronic money management server authenticates the first user terminal and the second user terminal by determining at least whether or not the at least part of the second electronic certificate information received from the first user terminal corresponds with second electronic certificate information stored in the electronic money management server, and whether or not at least part of the first electronic certificate information received from the second user terminal corresponds with first electronic certificate information stored in the electronic money management server; a access key transmission step, wherein an access key is sent to each of the first user terminal and the second user terminal after the first user terminal and the second user terminal are authenticated in the authentication step; a fourth receiving step, wherein the electronic money management server receives from the first user terminal, the access key, an instruction to transfer the electronic money to the second user terminal, and an amount to be sent, and from the second user terminal, the access key and an instruction to receive the electronic money from the first user terminal; a settlement determination step after the fourth receiving step, wherein the electronic money management server determines at least whether or not the access key received from the first user terminal and the access key received from the second user terminal correspond with each other, and whether or not the amount to be sent is within a balance of the first user's electronic money stored in the electronic money management server; and a settlement step, wherein the electronic money management server reduces by the amount to be sent, the balance of the first user's electronic money in the electronic money management server, and increases by the amount to be sent, a balance of the second user's electronic money in the electronic money management server if it is determined in the settlement determination step that the access keys correspond with each other, and that the amount to be sent is within the balance of the first user's electronic money.

According to yet another principal aspect of the present invention, there is provided a system for transferring electronic money from a first user to a second user, the system having a first user terminal owned by the first user, a second user terminal owned by the second user, and an electronic money management server, wherein the electronic money management server is in communication with the first user terminal and the second user terminal through a communication line, and stores electronic money of the first user and electronic money of the second user, wherein the electronic money management server and the first user terminal store a first electronic certificate associated with first user information and/or the first user terminal, whereas the electronic money management server and the second user terminal store a second electronic certificate associated with second user information and/or the second user terminal, the system comprising: a first receiving section for causing the first user terminal to receive at least part of the second electronic certificate information from the second user terminal via near field communication or the communication line, and stores the at least part of the second electronic certificate information in a memory of the first user terminal; a second receiving section for causing the second user terminal to receive at least part of the first electronic certificate information from the first user terminal via the near field communication or the communication line, and store the at least part of the first electronic certificate information in a memory of the second user terminal; a third receiving section for causing the electronic money management server to receive the at least part of the second electronic certificate information from the first user terminal, and receive the at least part of the first electronic certificate information from the second user terminal; an authentication section for causing the electronic money management server to authenticate the first user terminal and the second user terminal by determining at least whether or not the at least part of the second electronic certificate information received from the first user terminal corresponds with second electronic certificate information stored in the electronic money management server, and whether or not the at least part of the first electronic certificate information received from the second user terminal corresponds with first electronic certificate information stored in the electronic money management server; an access key transmission section for sending an access key to each of the first user terminal and the second user terminal after the first user terminal and the second user terminal are authenticated by the authentication section; a fourth receiving section for causing the electronic money management server to receive from the first user terminal, the access key and an instruction to transfer the electronic money to the second user terminal, and from the second user terminal, the access key, an instruction to receive the electronic money from the first user terminal, and an amount to be received; a settlement determination section for causing the electronic money management server to determine at least whether or not the access key received from the first user terminal and the access key received from the second user terminal correspond with each other, and whether or not the amount to be received is within a balance of the first user's electronic money stored in the electronic money management server if the fourth receiving section receives the access keys, the instructions and the amounts from the first user terminal and the second user terminal; and a settlement section for causing the electronic money management server to reduce by the amount to be received, the balance of the first user's electronic money in the electronic money management server, and increase by the amount to be received, a balance of the second user's electronic money in the electronic money management server if the settlement determination section determines that the access keys correspond with each other, and that the amount to be received is within the balance of the first user's electronic money.

According to yet another principal aspect of the present invention, there is provided a system for transferring electronic money from a first user to a second user, the system having a first user terminal owned by the first user, a second user terminal owned by the second user, and an electronic money management server, wherein the electronic money management server is in communication with the first user terminal and the second user terminal through a communication line, and stores electronic money of the first user and electronic money of the second user, wherein the electronic money management server and the first user terminal store a first electronic certificate associated with first user information and/or the first user terminal, whereas the electronic money management server and the second user terminal store a second electronic certificate associated with second user information and/or the second user terminal, the system comprising: a first receiving section for causing the first user terminal to receive at least part of the second electronic certificate information from the second user terminal via near field communication or the communication line, and stores the at least part of the second electronic certificate information in a memory of the first user terminal; a second receiving section for causing the second user terminal to receive at least part of the first electronic certificate information from the first user terminal via the near field communication or the communication line, and store the at least part of the first electronic certificate information in a memory of the second user terminal; a third receiving section for causing the electronic money management server to receive the at least part of the second electronic certificate information from the first user terminal, and receive the at least part of the first electronic certificate information from the second user terminal; an authentication section for causing the electronic money management server to authenticate the first user terminal and the second user terminal by determining at least whether or not the at least part of the second electronic certificate information received from the first user terminal corresponds with second electronic certificate information stored in the electronic money management server, and whether or not the at least part of the first electronic certificate information received from the second user terminal corresponds with first electronic certificate information stored in the electronic money management server; an access key transmission section for sending an access key to each of the first user terminal and the second user terminal after the first user terminal and the second user terminal are authenticated by the authentication section; a fourth receiving section for causing the electronic money management server to receive from the first user terminal, the access key, an instruction to transfer the electronic money to the second user terminal, and an amount to be sent, and from the second user terminal, the access key and an instruction to receive the electronic money from the first user terminal; a settlement determination section for causing the electronic money management server to determine at least whether or not the access key received from the first user terminal and the access key received from the second user terminal correspond with each other, and whether or not the amount to be sent is within a balance of the first user's electronic money stored in the electronic money management server if the fourth receiving section receives the access keys, the instructions and the amounts from the first user terminal and the second user terminal; and a settlement section for causing the electronic money management server to reduce by the amount to be sent, the balance of the first user's electronic money in the electronic money management server, and increase by the amount to be sent, a balance of the second user's electronic money in the electronic money management server if the settlement determination section determines that the access keys correspond with each other, and that the amount to be sent is within the balance of the first user's electronic money.

As described above, in the present invention, the first user terminal receives at least part of the second electronic certificate information from the second user terminal in the first receiving step, and the second user terminal receives at least part of the first electronic certificate information from the first user terminal in the second receiving step. Thus, after the first user terminal and the second user terminal exchange at least part of their electronic certificates, the electronic money management server receives the exchanged at least part of the electronic certificate information from the respective user terminals in the third receiving step, and determines whether or not the received at least part of the electronic certificate information correspond with the electronic certificate information stored in the electronic money management server. In other words, since the electronic certificate information of one terminal is sent from the other terminal to the electronic money management server, and electronic certificate information of the other terminal is sent from the one terminal to the electronic money management server, the two terminals which are about to perform a transaction are identified at this point, and the respectively sent electronic certificates are cross-checked by the electronic money management server. Accordingly, the electronic money management server may ensure the authentication of the terminals which are about to perform the electronic money remittance and payment receipt.

Here, the first electronic certificate of the first user terminal is unique information that only the first user terminal and the electronic money management server comprise, and the second electronic certificate of the second user terminal is unique information that only the second user terminal and the electronic money management server comprise. Also, at least part of the first electronic certificate information is sent from the second user terminal to the electronic money management server, and at least part of the second electronic certificate information is sent from the first user terminal to the electronic money management server. Further, the electronic money management server receives the at least part of the electronic certificate information from both of the first and second user terminals to thereby authenticate the terminals which are about to perform the electronic money remittance and payment receipt. Thus, even if, for example, the second user terminal obtains the first user terminal's electronic certificate information illegally and somehow tries to obtain electronic money the first user owns, the electronic money will never be sent from the first user to the second user unless the first user terminal sends its electronic certificate information to the electronic money management server.

Also as described previously, after authenticating the two terminals which are about to perform the electronic money remittance and payment receipt, the electronic money management server sends the access key to each of the terminals, and receives the instruction to send or receive the electronic money together with the access key from each of the terminals in the present invention. Further, the electronic money management server determines whether or not the access keys received from the terminals correspond with each other before performing the transfer processing the electronic money from the first user to the second user within the management server 300. As such, the issuance of the access keys and the determination of the access keys' correspondence improve the safety of the electronic money transfer from the first user to the second user.

Also, since the electronic money of each user is stored in the electronic money management server in the present invention, even if, for example the first user terminal is lost and may not be collected, the terminal loss alone does not result in a loss of the first user's electronic money.

Further in the present invention, since the first and second terminals mutually exchange their electronic certificate contents, and send the instructions to send and receive electronic money together with the access keys issued by the electronic money management server, respectively, the first user may send the electronic money directly to the second user while ensuring the safety of electronic money transfer. Thus, the electronic money may be transferred in a way extremely similar to that using cash.

Also, according to one embodiment of the present invention, the method of transferring electronic money further comprises: a authentication transmission step, wherein the electronic money management server notifies the first user terminal and the second user terminal after the authentication step that these terminals were successfully authenticated; and a access key request receiving step, wherein the electronic money management server receives a request for sending the access key, from each of the first user terminal and the second user terminal after the authentication transmission step, wherein, in the access key transmission step, the access key is sent to each of the first user terminal and the second user terminal in response to the access key request receiving step.

Additionally, in the method of transferring electronic money according to another embodiment of the present invention, only the electronic money management server comprises a secret key of the first electronic certificate in the first electronic certificate or in association with the first electronic certificate, and only the electronic money management server comprises a secret key of the second electronic certificate in the second electronic certificate or in association with the second electronic certificate, and in the authentication step, at least part of the first and second electronic certificate information is decrypted using the secret keys of the first and second electronic certificates, respectively, to thereby determine whether or not the decrypted information corresponds with first and second electronic certificate information, respectively, stored in the electronic money management server.

Further, in the method of transferring electronic money according to still another embodiment of the present invention, the electronic money management server may store the electronic money of the first user in association with a plurality of electronic money account numbers, in the fourth receiving step, the electronic money management server further receives from the first user terminal, an electronic money account number from which the remittance is to be made, in the settlement determination step, it is determined whether or not the amount to be received is within the balance of the first user's electronic money stored in association with the electronic money account number from which the remittance is to be made, and in the settlement step, the balance of the first user's electronic money is reduced by the amount to be received if it is determined in the settlement determination step that the access keys correspond with each other, and that the amount to be received is within the balance of the first user's electronic money.

Moreover, according to still another embodiment of the present invention, the method of transferring electronic money further comprises: after the first receiving step, a first replacement step, wherein the first user terminal replaces part of the first electronic certificate with at least part of the second electronic certificate information, or a first addition step, wherein the first user terminal adds at least part of the second electronic certificate information to the first electronic certificate; after the second receiving step, a second replacement step, wherein the second user terminal replaces part of the second electronic certificate with at least part of the first electronic certificate information; or a second addition step, wherein the second user terminal adds at least part of the first electronic certificate information to the second electronic certificate; and in the third receiving step, receiving at least part of the second electronic certificate information by receiving from the first user terminal, the first electronic certificate changed by the first replacement step or the first addition step, as well as receiving at least part of the first electronic certificate information by receiving from the second user terminal, the second electronic certificate changed by the second replacement step or the second addition step.

Also, according to yet another embodiment of the present invention, the method of transferring electronic money further comprises: a invalidating step after the settlement step, wherein the electronic money management server invalidates the access keys received from the first user terminal and the second user terminal, on said access keys the settlement determination step already performed the determination.

Also, in the method of transferring electronic money according to still another embodiment of the present invention, in the first and second receiving step, the first user terminal receives the at least part of the second electronic certificate information from the second user terminal, and the second user terminal receives the at least part of the first electronic certificate information from the first user terminal through the near field communication, which enables communication between the first user terminal and the second user terminal when a distance between the first user terminal and the second user terminal is several cm to ten and several cm.

Also, in the method of transferring electronic money according to yet another embodiment of the present invention, the electronic money management server stores the first electronic certificate in association with first individual authentication information owned by the first user terminal and stores the second electronic certificate in association with individual authentication information owned by the second user terminal, in the third receiving step, the first individual authentication information is received from the first user terminal, whereas the second individual authentication information is received from the second user terminal, and in the authentication step, the first user terminal and the second user terminal are authenticated by determining whether or not information which was kept unchanged in the first electronic certificate after the first replacement step or the first addition step, and the first individual authentication information correspond with each other, and also by determining whether or not information which was kept unchanged in the second electronic certificate after the second replacement step or the second addition step, and the second individual authentication information correspond with each other.

According to still another principal aspect of the present invention, there is provided a method of transferring electronic money from a first user to a second user by using a first user terminal owned by the first user, a second user terminal owned by the second user, and an electronic money management server, wherein the electronic money management server is in communication with the first user terminal and the second user terminal through a communication line, and stores electronic money of the first user and electronic money of the second user, wherein the electronic money management server and the first user terminal store a first certificate information associated with first user information and/or the first user terminal, whereas the electronic money management server and the second user terminal store a second certificate information associated with second user information and/or the second user terminal, the method comprising: a first receiving step, wherein the first user terminal receives second terminal information from the second user terminal via near field communication or the communication line, said second terminal information being at least part of the second certificate information, and stores the second terminal information in a memory of the first user terminal; a second receiving step, wherein the second user terminal receives first terminal information from the first user terminal via the near field communication or the communication line, the first terminal information being at least part of the first certificate information, and stores the first terminal information in a memory of the second user terminal; a third receiving step, wherein the electronic money management server receives the second terminal information from the first user terminal, and receives the first terminal information from the second user terminal after the first receiving step and the second receiving step; a authentication step, wherein the first user terminal and the second user terminal are authenticated by determining at least whether or not the second terminal information received from the first user terminal corresponds with second terminal information stored in the electronic money management server, and whether or not the first terminal information received from the second user terminal corresponds with first terminal information stored in the electronic money management server; a fourth receiving step, wherein the access key and an instruction to transfer the electronic money to the second user terminal are received from the first user terminal, wherein the access key, an instruction to receive the electronic money from the first user terminal, and an amount to be received are received from the second user terminal, and further wherein an amount to be sent to the second user terminal is received from the first user terminal or the amount to be received from the first user terminal is received from the second user terminal after the first user terminal and the second user terminal were authenticated in the authentication step; a settlement determination step after the fourth receiving step, wherein the electronic money management server determines at least whether or not the access key received from the first user terminal and the access key received from the second user terminal correspond with each other, and whether or not the amount to be sent or the amount to be received is within a balance of the first user's electronic money stored in the electronic money management server; and a settlement step, wherein the balance of the first user's electronic money in the electronic money management server is reduced by the amount to be received, and a balance of the second user's electronic money in the electronic money management server is increased by the amount to be received if it is determined in the settlement determination step that the access keys correspond with each other, and that the amount to be sent or the amount to be received is within the balance of the first user's electronic money.

As described above, in the present invention, the first user terminal receives the second terminal information, which is at least part of the second certificate information, from the second user terminal in the first receiving step, and the second user terminal receives the first terminal information, which is at least part of the first certificate information, from the first user terminal in the second receiving step. Thus, after the first user terminal and the second user terminal exchange at least part of their certificate information, the electronic money management server receives the exchanged at least part of the certificate information from the respective user terminals in the third receiving step, and determines whether or not the received at least part of the certificate information correspond with the certificate information stored in the electronic money management server. In other words, since the certificate information of one terminal is sent from the other terminal to the electronic money management server, and certificate information of the other terminal is sent from the one terminal to the electronic money management server, the two terminals which are about to perform a transaction are identified at this point, and the respectively sent electronic certificate information is cross-checked by the electronic money management server. Accordingly, the electronic money management server may ensure the authentication of the terminals which are about to perform the electronic money remittance and payment receipt.

Here, the first certificate information of the first user terminal is unique information that only the first user terminal and the electronic money management server comprise, and the second certificate information of the second user terminal is unique information that only the second user terminal and the electronic money management server comprise. Also, at least part of the first certificate information is sent from the second user terminal to the electronic money management server, and at least part of the second certificate information is sent from the first user terminal to the electronic money management server. Further, the electronic money management server receives the certificate information from both of the first and second user terminals to thereby authenticate the terminals which are about to perform the electronic money remittance and payment receipt. Thus, even if, for example, the second user terminal obtains the first user terminal's certificate information illegally and somehow tries to obtain electronic money the first user owns, the electronic money will never be sent from the first user to the second user unless the first user terminal sends its certificate information to the electronic money management server.

Also, since the electronic money of each user is stored in the electronic money management server in the present invention, even if, for example the first user terminal is lost and may not be collected, the terminal loss alone does not result in a loss of the first user's electronic money.

Further in the present invention, since the first and second terminals mutually exchange their certificate information contents, and send the instructions to send and receive electronic money, respectively, the first user may send the electronic money directly to the second user while ensuring the safety of electronic money transfer. Thus, the electronic money may be transferred in a way extremely similar to that using cash.

Also, according to yet another principal aspect of the present invention, there is provided a method of transferring electronic money from a first user to a second user by using a first user terminal owned by the first user, a second user terminal owned by the second user, and an electronic money management server, wherein the electronic money management server is in communication with the first user terminal and the second user terminal through a communication line, and stores electronic money of the first user and electronic money of the second user, wherein the electronic money management server and the first user terminal store a first certificate information associated with first user information and/or the first user terminal, whereas the electronic money management server and the second user terminal store a second certificate information associated with second user information and/or the second user terminal, the method comprising: a first receiving step, wherein the first user terminal receives from the second user terminal via near field communication or the communication line, second terminal information, said second terminal information being at least part of the second certificate information, and an amount to be received by the second user terminal from the first user terminal, and stores the second terminal information and the amount to be received in a memory of the first user terminal; a authentication step, wherein the first user terminal and the second user terminal are authenticated by determining at least whether or not the first terminal information received from the first user terminal corresponds with first terminal information stored in the electronic money management server, and whether or not the second terminal information corresponds with second terminal information stored in the electronic money management server; a settlement determination step after the authentication step, wherein it is at least determined whether or not the amount to be received is within a balance of the first user's electronic money stored in the electronic money management server; and a settlement step, wherein the balance of the first user's electronic money in the electronic money management server is reduced by the amount to be received, and a balance of the second user's electronic money in the electronic money management server is increased by the amount to be received if it is determined in the settlement determination step that the amount to be received is within the balance of the first user's electronic money.

As described above, in the instant invention, the first user terminal receives second terminal information, which is at least part of the second certificate information, from the second user terminal in the first receiving step. Thus, after the first user terminal receives from the second user terminal its certificate information, the electronic money management server receives the second user terminal's certificate information from the first user terminal in the second receiving step, and determines whether or not the first user terminal's certificate information and the second user terminal's certificate information received from the first user terminal corresponds with the first and second user terminals' certificate information stored in the electronic money management server. In other words, since the second user terminal's certificate information is sent from the first user terminal to the electronic money management server, the two terminals which are about to perform a transaction are identified at this point, and the certificate information of both parties sent from the first user terminal is cross-checked by the electronic money management server. Accordingly, the electronic money management server may ensure the authentication of the terminals which are about to perform the electronic money remittance and payment receipt.

Here, the first certificate information of the first user terminal is unique information that only the first user terminal and the electronic money management server comprise, and the second certificate information of the second user terminal is unique information that only the second user terminal and the electronic money management server comprise. Also, at least part of the second certificate information is sent by the first user terminal to the electronic money management server. Further, the electronic money management server receives the certificate information of the both parties conducting the transaction from the first user terminal to thereby authenticate the terminals which are about to perform the electronic money remittance and payment receipt. Thus, even if, for example, the second user terminal obtains the first user terminal's certificate information illegally and somehow tries to obtain electronic money the first user owns, the electronic money will never be sent from the first user to the second user unless the first user terminal sends the certificate information of the both parties of the transaction to the electronic money management server.

Also, since the electronic money of each user is stored in the electronic money management server in the present invention, even if, for example the first user terminal is lost and may not be collected, the terminal loss alone does not result in a loss of the first user's electronic money.

Further, since the second user terminal sends its certificate information to the first user terminal, and instructions to send and receive electronic money are sent in the present invention, the first user may send the electronic money directly to the second user while ensuring the safety of electronic money transfer. Thus, the electronic money may be transferred in a way extremely similar to that using cash.

According to the present invention, electronic money may be handled in a sense that is very similar to handling cash, and loss of the electronic money is prevented even when a terminal for operating the electronic money is lost or stolen.

It is to be noted that other characteristics and marked effects of the present invention will be appreciated to those skilled in the art upon referring to the following detailed description of the preferred embodiments and the accompanying drawings.

BRIEF DESCRIPTION OF THE DRAWINGS

FIG. 5 is an example of customer contract master;

FIG. 6 is an example of account data;

FIG. 28 is an example of a benefit table;

DETAILED DESCRIPTION OF THE INVENTION

Below, an electronic money transfer system according to embodiments of the present invention will be discussed with reference to drawings.

Figure 1:
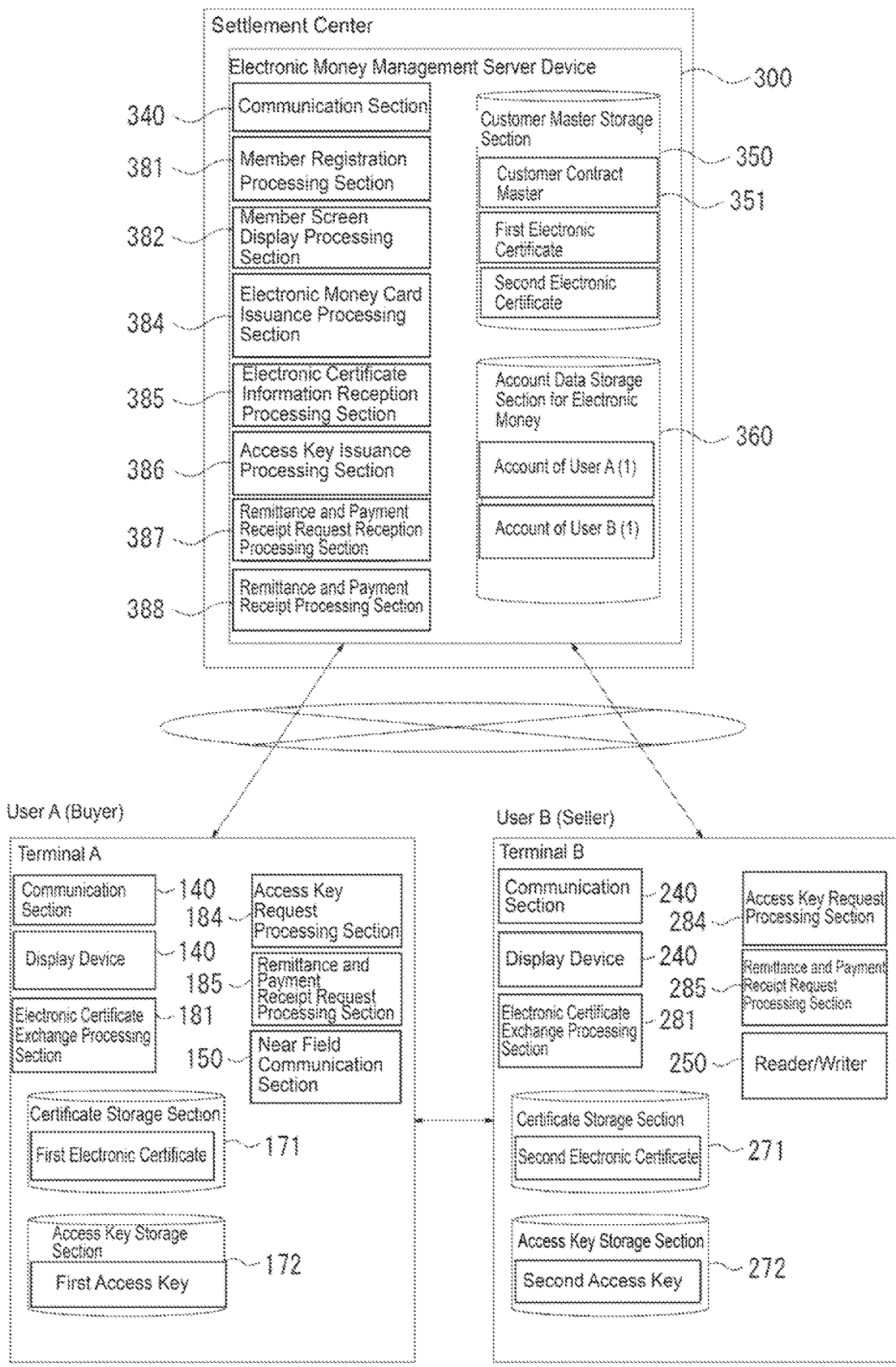
FIG. 1 is a schematic structural view of the electronic money transfer system according to one embodiment of the present invention.

FIG. 1 is a schematic structural view of the electronic money transfer system according to a first embodiment of the present invention. This system comprises, for example, a terminal A, owned by a user A (a first user), wherein the user A is a buyer; a terminal B, owned by a user B (a second user), wherein the user B is a store or an owner of the store as a seller; an electronic money management server (hereafter, simply referred to as a "management server") 300 in communication with each of the terminals A and B through communication lines such as the Internet, mobile networks and the like. The terminals A and B may be mobile phones equipped with functions comparable to those of personal digital assistants (PDAs) and/or personal computers (PCs), or they may be desktop or laptop PCs, computing devices such as POS terminals, or other known computing devices. In the present embodiment, the terminal A is a mobile phone equipped with functions comparable to those of PCs, and the terminal B is a POS terminal. Note that well known configurations such as a firewall, a Web server and the like are omitted in the figure and the description herein.

Figure 2:
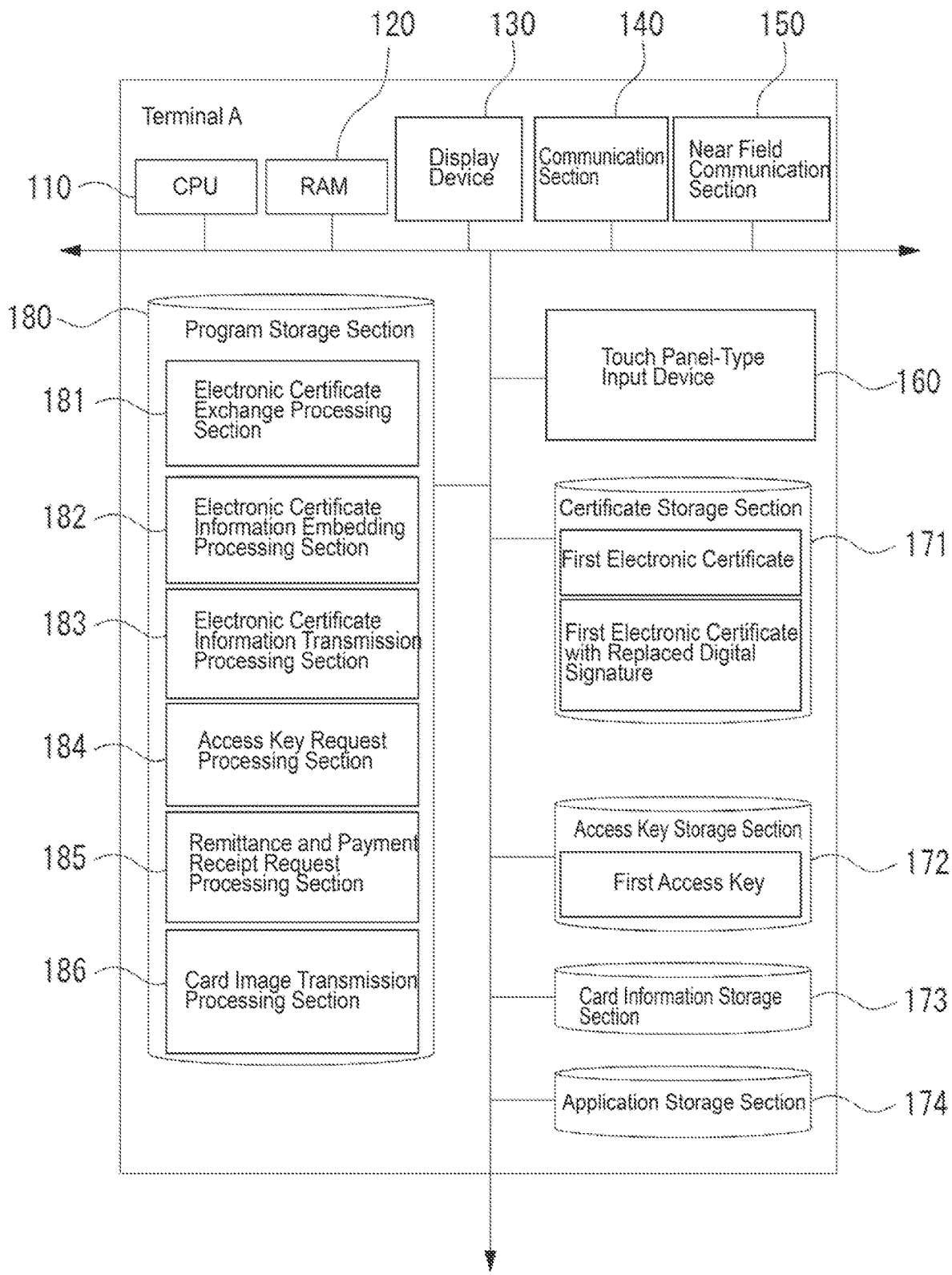
FIG. 2 is a schematic structural view of a terminal A.

FIG. 2 is a schematic structural view of the terminal A (a mobile phone equipped with functions comparable to those of PCs) of the present embodiment. As shown in FIG. 2, the terminal A comprises a CPU 110; a RAM 120; a display screen 130 such as a liquid crystal display; a communication section 140 comprising a communication interface including a communication antenna, a communication protocol stack for communications using mobile networks and the Internet, and the like; a near field communication section 150 comprising a communication interface including a near field communication (NFC) antenna, a communication protocol stack for near field communications, and the like; a well-known touch panel-type input device 160 for accepting a user input via the user's touching the display screen 130 with a finger or fingers of the user; a certificate storage section 171 for storing electronic certificates; an access key storage section 172 for storing access keys; a card information storage section 173; an application storage section 174; and a program storage section 180 for storing various programs.

In the program storage section 180, this terminal A comprises an electronic certificate exchange processing section 181; an electronic certificate information embedding processing section 182; an electronic certificate information transmission processing section 183; an access key request processing section 184; a remittance and payment receipt request processing section 185; and a card image transmission processing section 186, each of which causes the terminal A to perform predetermined actions. These functions will be discussed below with reference to examples of processing performed by the terminal A, the terminal B, the management server 300 and the like (see FIGS. 7, 8, 10 and 13 among others).

Figure 3:
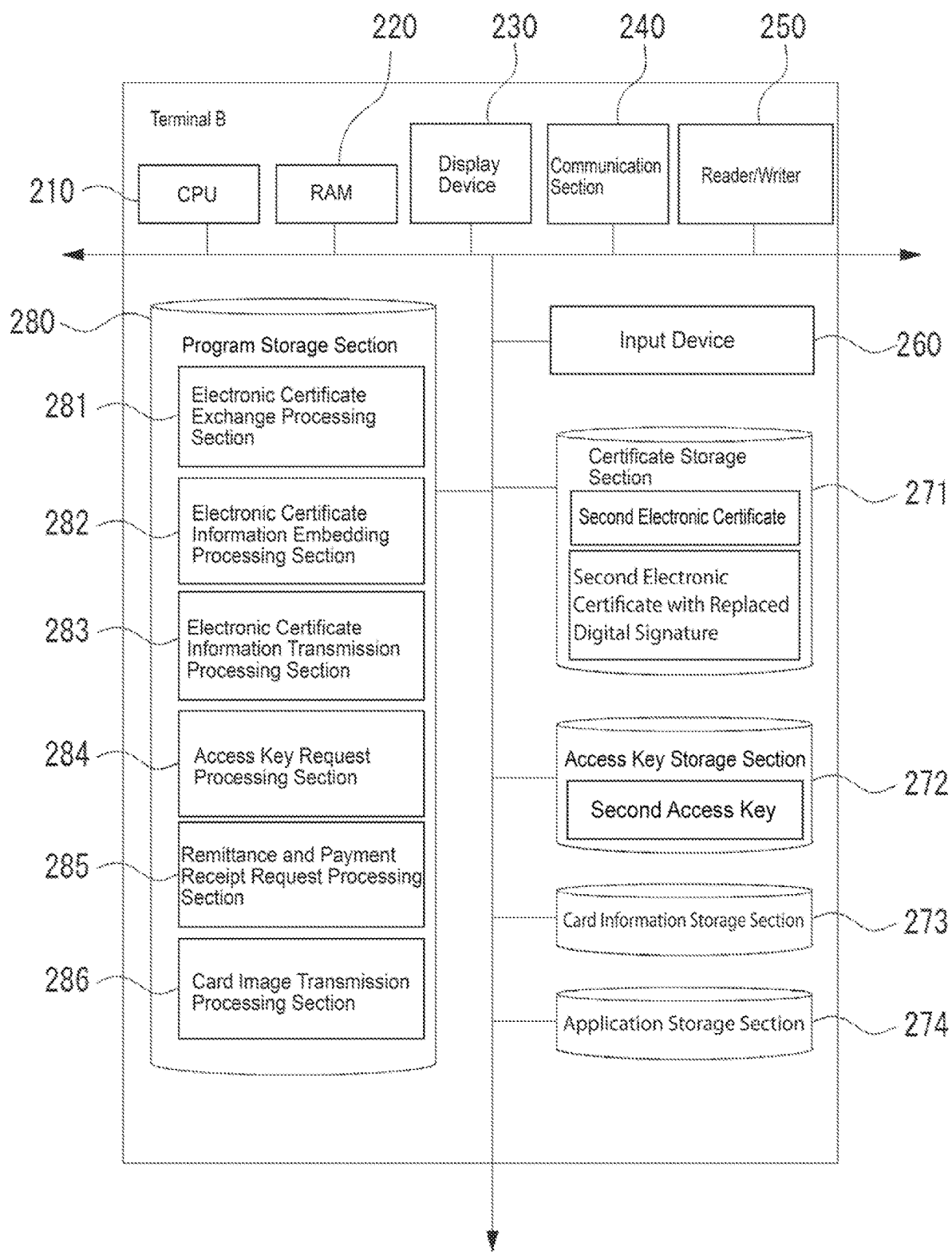
FIG. 3 is a schematic structural view of a terminal B.

FIG. 3 is a schematic structural view of the terminal B (POS terminal) of the present embodiment. As shown in FIG. 3, the terminal B comprises a CPU 210; a RAM 220; a display device 230 such as a liquid crystal display; a communication section 240 comprising a communication interface including a connector, a communication protocol stack for communications using the Internet, and the like; a reader/writer (near field communication section) 250 comprising a communication interface including a near field communication (NFC) antenna, a communication protocol stack for near field communications, and the like; an input device 260 consisting of a plurality of buttons; a certificate storage section 271 for storing electronic certificates; an access key storage section 272 for storing access keys; a card information storage section 273; an application storage section 274; and a program storage section 280 for storing various programs.

In the program storage section 280, this terminal B comprises an electronic certificate exchange processing section 281; an electronic certificate information embedding processing section 282; an electronic certificate information transmission processing section 283; an access key request processing section 284; a remittance and payment receipt request processing section 285; and a card image transmission processing section 286, each of which causes the terminal B to perform predetermined actions. These functions will be discussed below with reference to examples of processing performed by the terminal A, the terminal B, the management server 300 and the like (see FIGS. 7, 8, 10 and 13 among others). Also, components of the terminals A and B with the same name indicate that the components have an equivalent function or equivalent functions.

Figure 4:
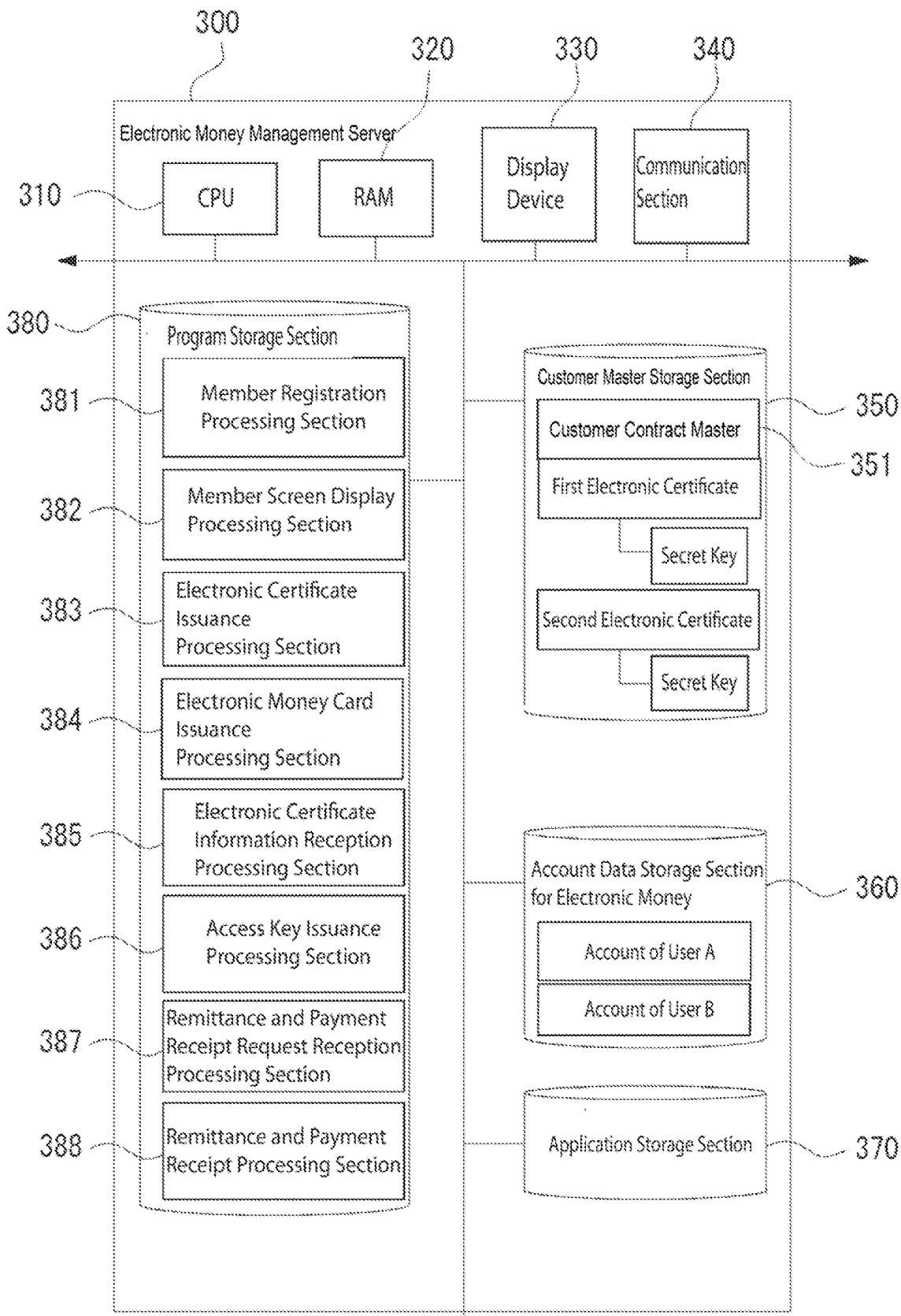
FIG. 4 is a schematic structural view of an electronic money management server.

FIG. 4 is a schematic structural view of the management server 300 of the present embodiment. This management server 300 comprises a CPU 310; a RAM 320; a display device 330 such as a liquid crystal display; a communication section 340 comprising a communication interface including a connector, a communication protocol stack for communications using the Internet, and the like; a customer master storage section 350; an account data storage section 360 for storing data of electronic money accounts; an application storage section 370 for storing applications for members; and a program storage section 380 for storing various programs.

The customer master storage section 350 of the management server 300 comprises a customer contract master 351 for associating customer information (a full name, a name, a nick name, an e-mail address, an answer to a secret question, etc.) with a login ID, a password, an electronic certificate, an account number of an electronic money account, etc. in the management server 300, as shown in FIG. 5. Also, the account data storage section 360 stores an account balance, a remittance and payment receipt history and the like for each account number as electronic money account data, as illustrated in FIG. 6.

In the program storage section 380, this management server 300 comprises a member registration processing section 381, a member screen display processing section 382, an electronic certificate issuance processing section 383, an electronic money card issuance processing section 384, an electronic certificate information reception processing section 385, an access key issuance processing section 386, a remittance and payment receipt request reception processing section 387, and a remittance and payment receipt processing section 388, each of which causes the management server 300 to perform predetermined actions. These functions will be discussed below with reference to examples of processing performed by the terminal A, the terminal B, the management server 300 and the like (see FIGS. 7, 8, 10 and 13 among others).

First, one example of processing performed by the terminal A and the management server 300 (see FIG. 7) will be used to discuss processing where the user A, who owns the terminal A, performs member registration which is required to, for example, purchase electronic money, and send or receive the electronic money on the management server 300. Note that the user A may be an individual or an organization.

First, the terminal A sends a request to the management server 300 for downloading an application for performing an electronic money transaction (Step S1), and in response to the request, the application is downloaded from the management server 300 to the terminal A (Step S2). Then, the terminal A launches the application, and a screen appears on the display screen 130 to confirm whether or not to proceed with the member registration. If the user A indicates his/her intention to proceed with the member registration at the terminal A, a request for the member registration is sent from the terminal A to the management server 300 (Step S3), and in response to this request, the member registration processing section 381 of the management server 300 displays a member registration screen on the display screen 130 of the terminal A (Step S4). On this member registration screen displayed first, the user A is required to enter an e-mail address that the user A owns. Next, when the user A enters and sends an e-mail address of the user A (Step S5), in response to this input, the member registration processing section 381 of the management server 300 sends an URL of the registration screen to the e-mail address of the user A (Step S6). Note that Steps S4 and S5 may be configured to so that a phone number of the terminal A (mobile phone) will be sent in place of the e-mail address.

Then, the user A operates the terminal A to send a request for displaying the URL screen (Step S7), and the member registration processing section 381 of the management server 300 displays the member registration screen on the display screen 130 of the terminal A (Step S8). Next, when the user A enters and sends a nick name, a full name, a password, an answer to a secret question and the like of the user A (Step S9), in response to these inputs, the member registration processing section 381 of the management server 300 sends a login ID to the e-mail address of the user A (Step S10). The member screen display processing section 382 allows the user A to log in on a member screen by using the login ID, password and/or the like.

As discussed earlier, the management server 300 stores information of the user A in the customer master 351 of the customer master storage section 350 of the management server 300 in the process of the user A's member registration (Step S11) (see FIG. 5).

Figure 7:
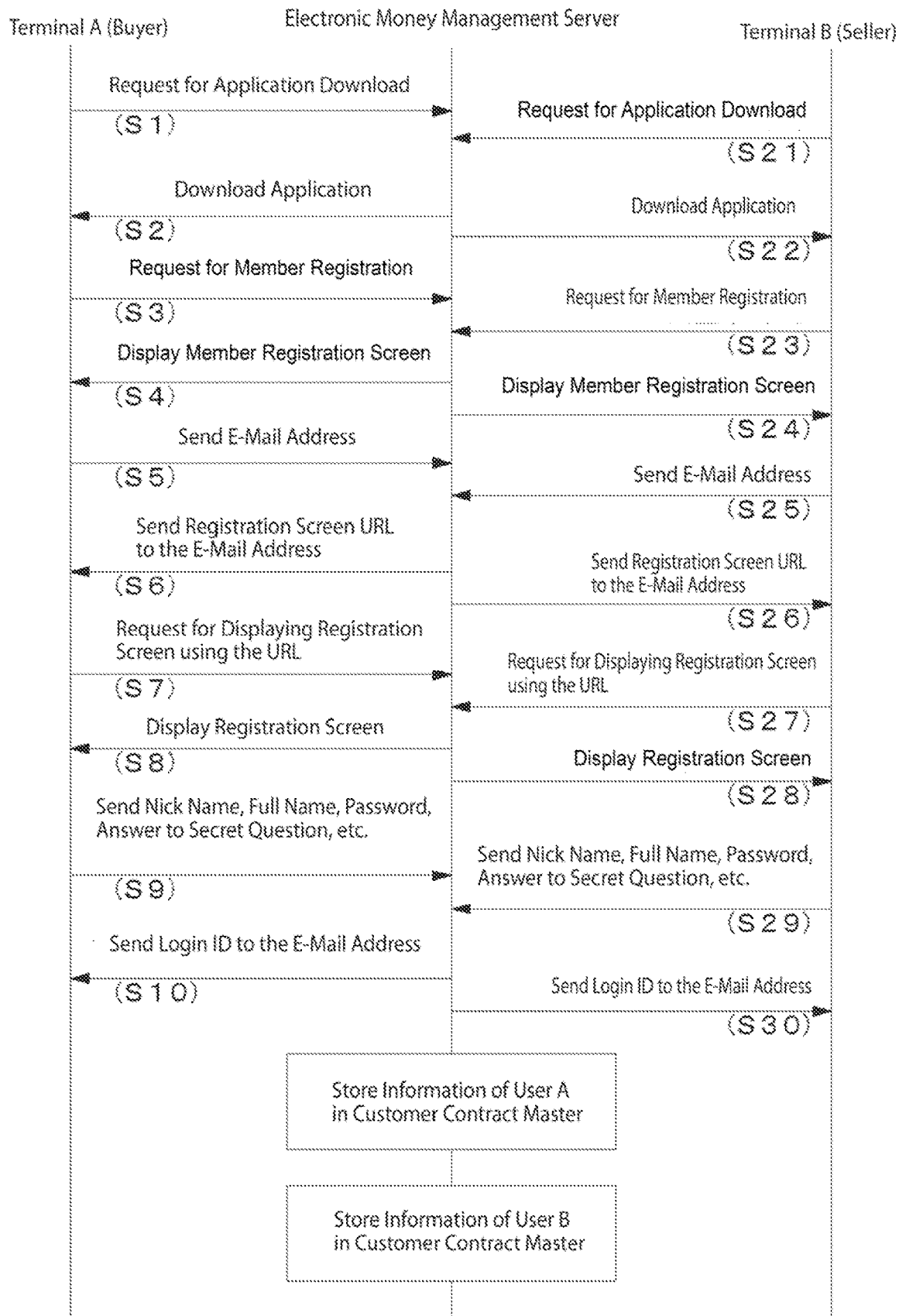
FIG. 7 is a flowchart showing processing in the terminal A, the terminal B and the electronic money management server.

Also, when the user B, who owns the terminal B, performs a member registration required to purchase the electronic money, and send or receive the electronic money on the management server 300, processing equivalent to one previously explained for the user A is performed (Steps S21-S31) on the terminal B and the management server 300, as shown in FIG. 7.

Next, an example of processing performed by the terminal A and the management server 300 (see FIG. 8) will be used to discuss processing where the terminal A obtains an electronic certificate which is required to send or receive the electronic money on the management server 300.

The member screen display processing section 382 of the management server 300 first displays a screen requiring the login ID and the password on the terminal A, and in response to the login ID and the password sent from the terminal A to the management server 300 (Step S41), the member screen display processing section 382 displays a post-login member screen on the display section 130 of the terminal A (Step S42). On this member screen, a button is provided for requesting issuance of an electronic certificate, and when the user A performs a request for electronic certificate issuance on the terminal A, the request for electronic certificate issuance is sent from the terminal A to the management server 300 (Step S43). Also, along with this request for electronic certificate issuance, or after this request, information of the terminal A as an individual device (individual information) is sent from the terminal A to the management server 300 (Step S44). Here, since the user A performs the login on the member screen on the terminal A using the user A's own login ID and password, and performs the request for electronic certificate issuance while logged in, the individual information is associated with the login ID, password and the like of the user A, and stored in the customer contract master 351 (see FIG. 5). Although a serial number of the terminal A may be used as the individual information, but other unique information of the terminal A may also be used.

Figure 9:
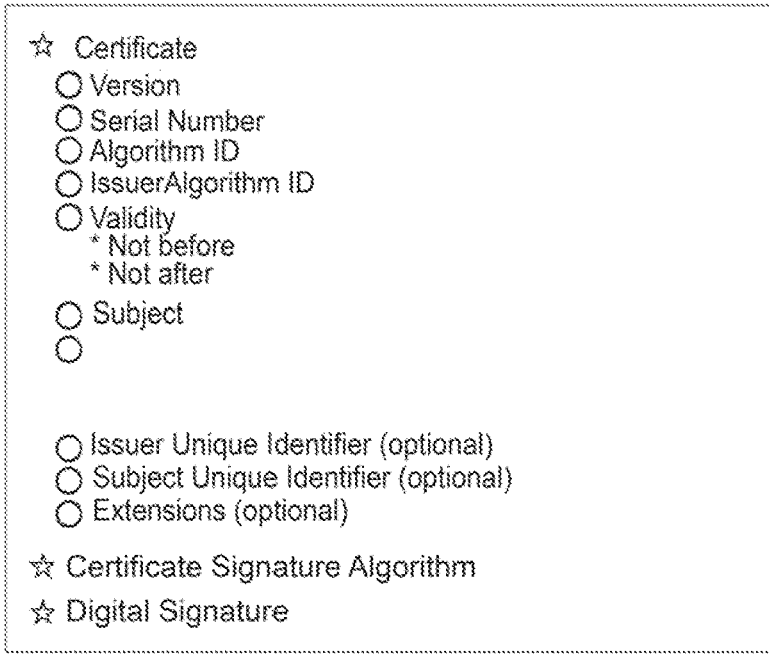
FIG. 9 is a diagram showing an overview of an electronic certificate.
Figure 10:
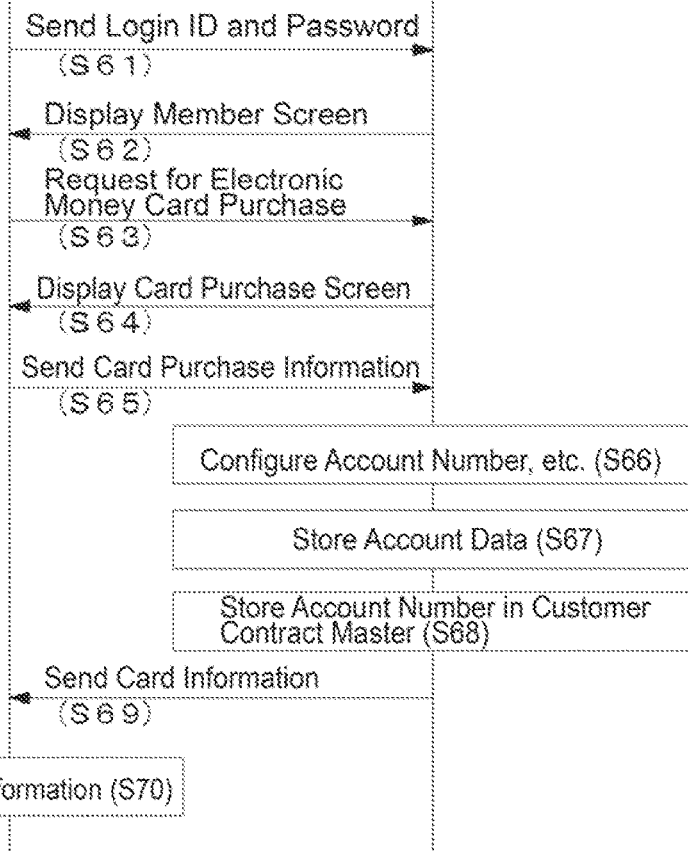
FIG. 10 is a flowchart showing processing in the terminal A and the electronic money management server.

Then, the management server 300 uses the electronic certificate issuance processing section 383 to create a first electronic certificate for the user A, associate the first electronic certificate with the terminal A, and store the first electronic certificate in the customer master storage section 350 (Step S45). Here, the first electronic certificate created by the electronic certificate issuance processing section 383 has a digital signature, a public key and the like, as shown schematically in FIG. 9. Also, the electronic certificate issuance processing section 383 of the management server 300 simultaneously creates a secret key, and stores it in the customer master storage section 350 in association with the first electronic certificate. Note that the electronic certificate is created by the management server 300 in the present embodiment, but it may be created by an external electronic certificate issuance provider.

Next, the electronic certificate issuance processing section 383 of the management server 300 sends the first electronic certificate to the terminal A (Step S46), and the terminal A stores the received first electronic certificate in the certificate storage section 171 of the terminal A (Step S47).

Figure 8:
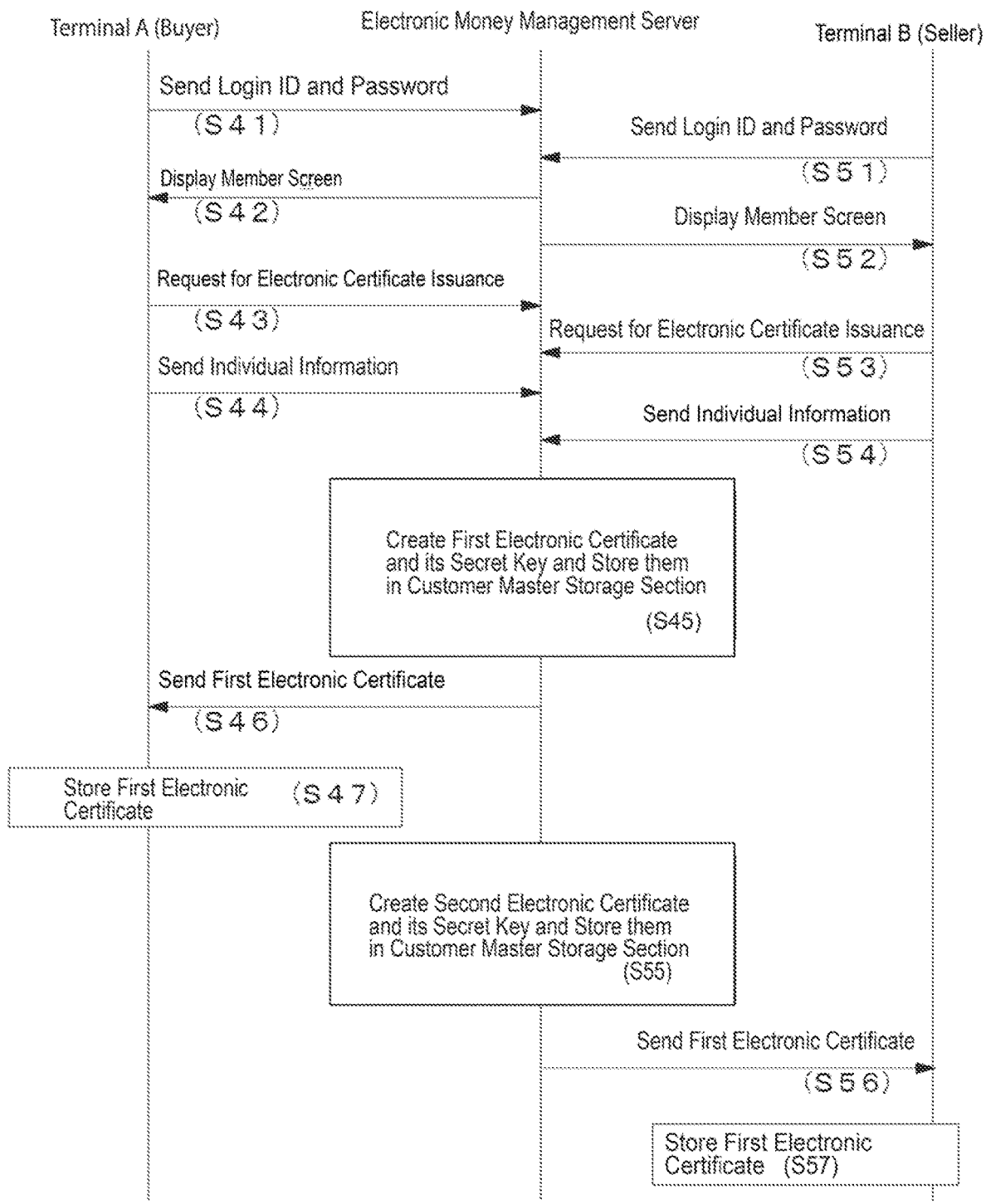
FIG. 8 is another flowchart showing processing in the terminal A, the terminal B and the electronic money management server.

Likewise, when the terminal B obtains an electronic certificate which is required to send or receive the electronic money on the management server 300, processing similar to one previously explained for the terminal A is performed (Steps S51-S57) on the terminal B and the management server 300, as shown in FIG. 8. In addition, a second electronic certificate and its secret key are created for the terminal B in the present embodiment. Note that the digital signature of the first electronic certificate may be decrypted only by the secret key of the first electronic certificate, and the digital signature of the second electronic certificate may be decrypted only by the secret key of the second electronic certificate.

Next, an example of processing performed by the terminal A and the management server 300 (see FIG. 10) will be used to discuss processing where the user A uses the terminal A to purchase an electronic money card. Note that this processing may be performed by the terminal B.

Figures 11, 12:
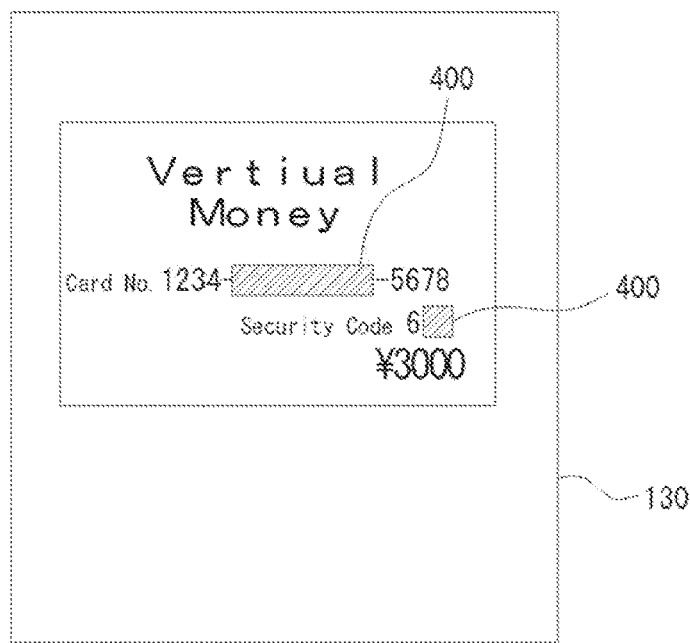
FIG. 11 is an example of a display screen of a display device.
FIG. 12 is another example of the display screen of the display device.
Figure 13:
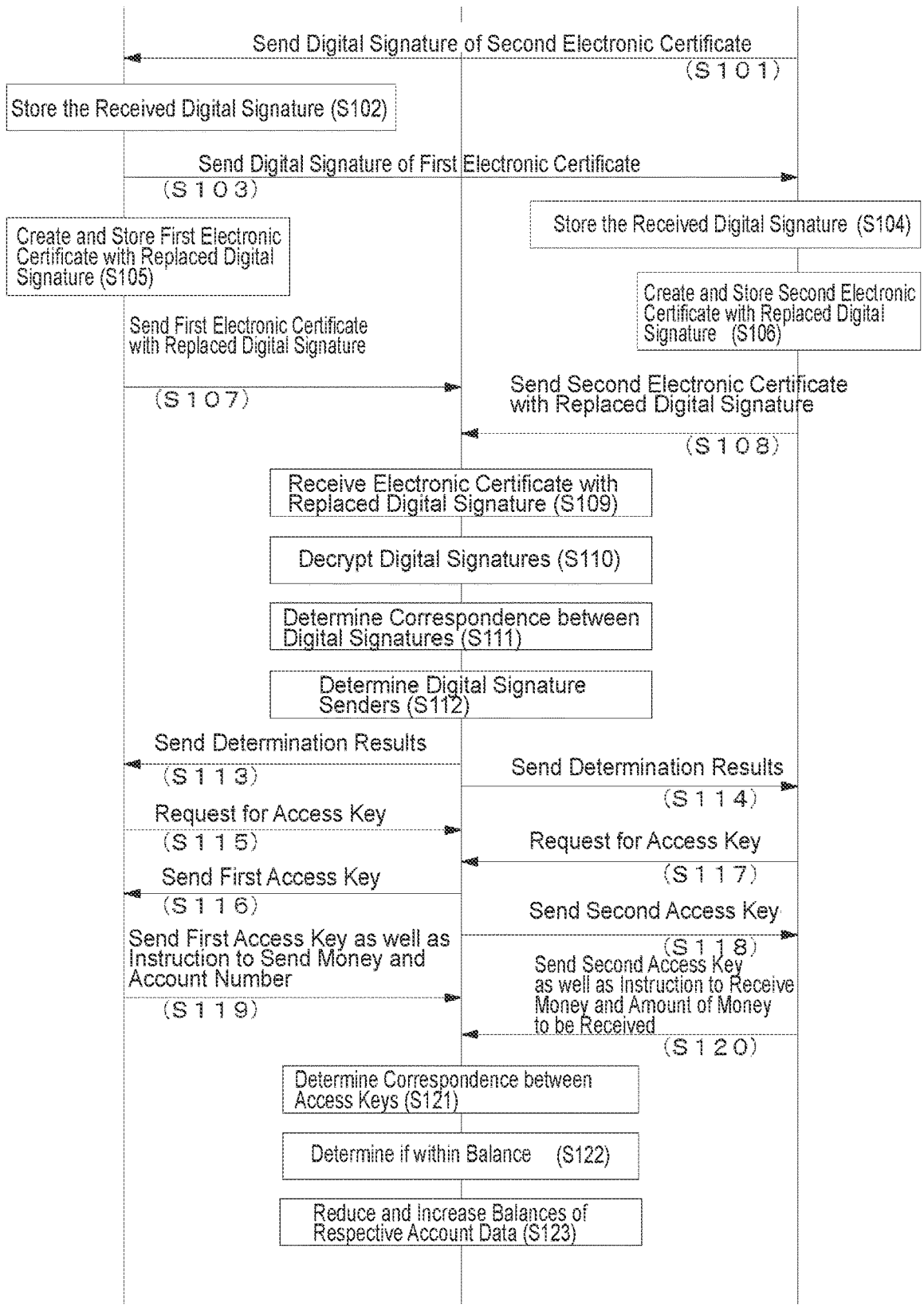
FIG. 13 is another flowchart showing processing in the terminal A, the terminal B and the electronic money management server.

First, the member screen display processing section 382 of the management server 300 displays a screen requiring a login ID and a password on the terminal A, and in response to the login ID and the password sent from the terminal A to the management server 300 (Step S61), the member screen display processing section 382 or the management server 300 displays a post-login member screen on the display section 130 of the terminal A (Step S62). On this member screen, a button is provided for purchasing an electronic money card, and when the user A performs a request to purchase an electronic money card on the terminal A, the request for electronic money card purchase is sent from the terminal A to the management server 300 (Step S63). Then, the management server 300 uses the electronic money card issuance processing section 384 to display an electronic money card purchase screen on the display screen 130 of the terminal A (see FIG. 11) (Step S64). As in FIG. 11, when the user A provides an input for each item of card purchase information and presses a purchase button, the card purchase information is sent from the terminal A to the management server 300 (Step S65). In the present embodiment, a card image (design) selected in FIG. 11 is one that the user may set as a graphic of choice. In this case, the user A selects the graphic that the user A likes to use as a card image of the user A's electronic money card, and the selected image is sent to the management server 300 in Step S65. Then, the electronic money card issuance processing section 384 of the management server 300 displays a required screen on the display screen 130 of the terminal A, and after an electronic money card fee is paid, and all information is entered, for example, the electronic money card purchase is completed.

Next, the electronic money card issuance processing section 384 of the management server 300 configures an electronic money account number (card number), security number and the like corresponding with the electronic money card that the user A purchased (Step S66), and stores account data of the electronic money account in the account data storage section 360 (Step S67) while storing the account number in the customer master 351 (Step S68), as shown in FIG. 5. In the present embodiment, the account number and the card number are the same. One example of the account data is shown in FIG. 6, and stores therein a remittance and payment receipt history, a balance and the like. Note that each user may create a plurality of electronic money accounts in the management server 300, and in that case, an account number (a card number) is created for each electronic money account. That is, each user may hold a plurality of electronic money cards, and the management server 300 manages each electronic money card in association with an account number (a card number).

Also, the management server 300 uses the electronic money card issuance processing section 384 to send card information such as the image, an amount of the purchased card and the account number (card number) of the card, to the terminal A (Step S69). The terminal A, on the other hand, stores the received card information in the card information storage section 173 (Step S70).

On the terminal A, as shown in FIG. 12, the application may display the card image, the account number (card number), the balance corresponding with the account number (card number) and a security code on the display device 130. Also, a masking 400 is displayed over each of the card number and the security code such that they are both partially obscured. In addition, if a finger touches the masking 400 on the display screen 130, the masking 400 disappears to reveal the previously hidden part of the card number and the security code. It is noted that, if the terminal A is a PC or a POS terminal, the masking 400 may be configured to disappear when a pointer is positioned over the masking 400.

In a similar way, the user B may also purchase the electronic money card.

Next, an example of processing performed by the terminal A, the terminal B and the management server 300 (see FIG. 13) will be used to discuss processing in a case where the user A (a buyer) purchases a product from the user B (a seller such as a store), and pays for the product with the electronic money.

First, the user A decides to purchase a product X, and takes it to the terminal B (POS terminal) of the user B. The terminal B is equipped with a barcode reader or the like, which reads a barcode affixed to the product X. Thus, a price of the product X, 300 yen, is displayed on the display device 230 of the POS terminal. If the user A decides to pay for the price shown on the display of the POS terminal, the user A uses the terminal A to access and log in on the member screen provided by the member screen display processing section 382 of the management server 300. Then, the user A displays a payment screen on the display screen 130 shown in FIG. 14, for example, brings the terminal A near the reader/writer 250 of the terminal B, and touches the Pay button of FIG. 14 with the user A's finger. Thus, Steps S101-S123 below will be performed, and the electronic money is transferred from the user A to the user B.

Figure 14:
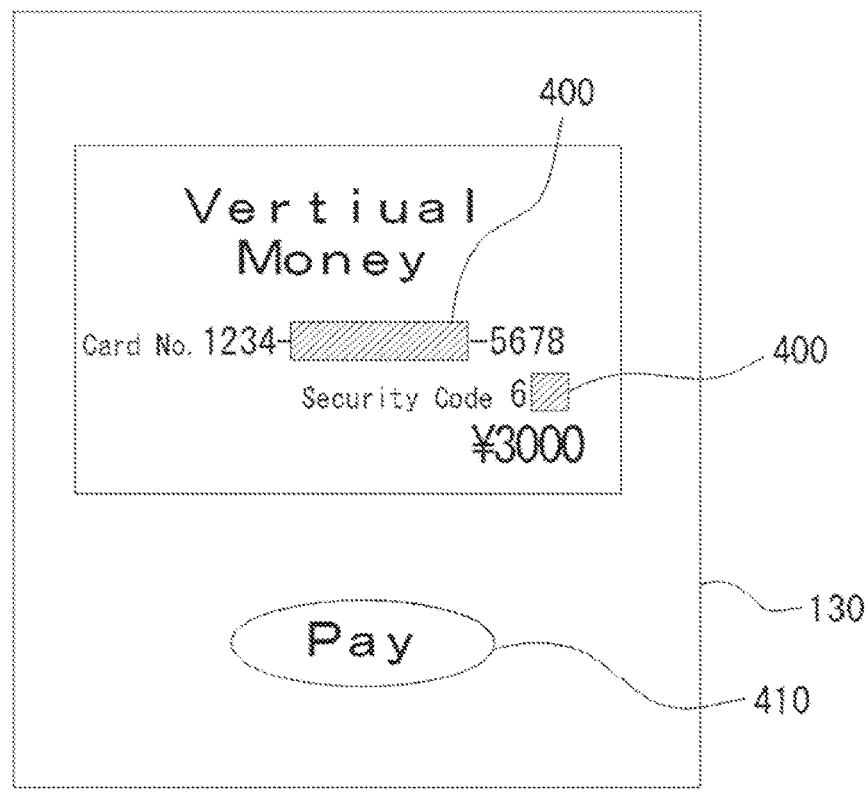
FIG. 14 is another example of the display screen of the display device.

Specifically, when the terminal A is first brought near the reader/writer 250 of the terminal B and the Pay button 410 of FIG. 14 is touched by a finger, the terminal B uses the electronic certificate exchange processing section 281 to send the digital signature in the second electronic certificate to the terminal A with near field communication, and the terminal A uses the electronic certificate exchange processing section 181 to receive the digital signature of the second electronic certificate sent from the terminal B (Step S101). Then, the terminal A stores the received digital signature in its certificate storage section and other sections of the terminal A's memory (Step S102). In the meantime, the terminal A uses the electronic certificate exchange processing section 181 to send the digital signature in the first electronic certificate to the terminal B with near field communication, and the terminal B uses the electronic certificate exchange processing section 281 to receive the digital signature of the first electronic certificate sent from the terminal A (Step S103). Then, the terminal B stores the received digital signature in its certificate storage section and other sections of the terminal B's memory (Step S104). Either Steps S101 or S103 may occur earlier than the other, or they may occur at the same time. Also, the near field communication is performed via the near field communication section 150 of the terminal A and the reader/writer 250 of the terminal B. Further, the near field communication section 150 and the reader/writer 250 may communicate with each other only when a distance between them is several cm to ten and several cm, but they may not communicate when the distance is over ten and several cm. Such near field communication technologies are seen in, for example, Type A and B of ISO/IEC 14443, and Felica® of ISO/IEC 18092. The present embodiment uses such a near field communication, but needless to say, other near field communications performed over longer distances may be used as well.

Continuing, the terminal A uses the electronic certificate information embedding processing section 182 to replace the digital signature of the first electronic certificate that the terminal A owns, with the digital signature of the received second electronic certificate to thereby create and store in the certificate storage section 171, a first electronic certificate with the replaced digital signature (Step S105). On the other hand, the terminal B replaces the digital signature of the second electronic certificate that the terminal B owns, with the digital signature of the received first electronic certificate to thereby create and store in the certificate storage section 271, a second electronic certificate with the replaced digital signature (Step S106).

Next, the terminal A uses the electronic certificate information transmission processing section 183 to send the first electronic certificate with the replaced digital signature to the management server 300 (Step S107), and the terminal B uses the electronic certificate information transmission processing section 283 to send the second electronic certificate with the replaced digital signature to the management server 300 (Step S108). At this point, the data sent from the terminal A includes the individual information of the terminal A, and the data sent from the terminal B includes the individual information of the terminal B.

Next, the management server 300 uses the electronic certificate information reception processing section 385 to receive the first and second electronic certificates with the replaced digital signature, respectively, from the terminals A and B (Step S109). Then, the management server 300 uses the electronic certificate information reception processing section 385 to decrypt the first electronic certificate with the replaced digital signature, and the replaced digital signature originally from the second electronic certificate and now included in the first electronic certificate, using the corresponding secret key stored in the customer master storage section 350; and simultaneously decrypt the second electronic certificate with the replaced digital signature, and the replaced digital signature originally from the first electronic certificate and now included in the second electronic certificate, using the corresponding secret key stored in the customer master storage section 350 (Step S110).

Continuing, the management server 300 uses the electronic certificate information reception processing section 385 to determine (1) whether or not the decrypted digital signature of the first electronic certificate and the digital signature of the first electronic certificate stored in the customer master storage section 350 correspond with each other, and (2) whether or not the decrypted digital signature of the second electronic certificate and the digital signature of the second electronic certificate stored in the customer master storage section 350 correspond with each other (Step S111). Also, the management server 300 uses the electronic certificate information reception processing section 385 to determine (3) whether or not a sender of the digital signature of the second electronic certificate is the terminal A (a terminal associated with the first electronic certificate), and (4) whether or not a sender of the digital signature of the first electronic certificate is the terminal B (a terminal associated with the second electronic certificate) (Step S112). Here, the determination in Step S112 may be performed by comparing parts other than the digital signature of the first and second electronic certificates with the replaced digital signature, respectively; and parts other than the digital signature of the first and second electronic certificates stored in the customer master storage section 350. Alternatively, the determination in Step S112 may be performed by comparing the individual information included in the data sent from each of the terminals A and B, and the individual information stored in the customer contract master 351 of the customer master storage section 350. Other methods for determining the above (3) and (4) may be used to perform Step S112. In other words, Step S112 may be performed by determining whether or not electronic certificate information of itself (the terminal A) is sent from the other terminal (the terminal B) to the management server 300, and electronic certificate information of the other terminal (the terminal B) is sent from itself (the terminal A) to the management server 300.

Next, if all of the above (1)-(4) are determined to be matches, the electronic certificate information reception processing section 385 sends the determination results to each of the terminals A and B (Steps S113 and S114). Then, the terminal A uses the access key request processing section 184 to send a request for an access key to the management server 300 (Step S115), and in response, the management server 300 uses the access key issuance processing section 386 to send a first access key to the terminal A (Step S116), where the first access key is stored in the access key storage section 172. The access key issuance processing section 386 issues a unique access key every time it receives a request for an access key. Whereas, when the terminal B uses the access key request processing section 284 to send a request for an access key to the management server 300 (Step S117), the management server 300 uses the access key issuance processing section 386 to send a second access key to the terminal B (Step S118), where the second access key is stored in the access key storage section 272. In the present embodiment, the issuance of the access keys in Steps S116 and S118 does not occur unless the above (1)-(4) are determined to be matches in Steps S111 and S112. Also, the access key issuance processing section 386 issues the first and second access keys in such a way that the remittance and payment receipt request reception processing section 387 recognizes that the first access key corresponds with the second access key.

Continuing, the terminal A uses the remittance and payment receipt request processing section 185 to send the first access key, an instruction to send money to the user B as the owner of the terminal B, and the account number of the electronic money account (the card number of the electronic money card, which card number is indicated on the display device 130) from which the remittance is to be made, to the management server 300 (Step S119), and the management server 300 receives them by the remittance and payment receipt request reception processing section 387. On the other hand, the terminal B uses the remittance and payment receipt request processing section 285 to send the second access key, an amount of money to be received, 300 yen, from the user A as the owner of the terminal A, and an instruction to receive money to the management server 300 (Step S120), and the management server 300 receives them by the remittance and payment receipt request reception processing section 387.

Next, the management server 300 uses the remittance and payment receipt request reception processing section 387 to determine whether or not the access key received from the terminal A and the access key received from the terminal B correspond with each other (Step S121). Also, the management server 300 uses the remittance and payment receipt request reception processing section 387 to determine whether or not the amount of money to be received is within a balance of the user A's account, which balance is stored in the account data storage section 360 of the management server 300, more specifically, whether or not the amount of money to be received is within a balance of the account of the card number (account number) displayed on the display screen 130 of the terminal A (hereafter, referred to as an "account a") (Step S122).

If the access keys are determined to correspond with each other in the above Step S121, and if the amount of money to be received is determined to be within the balance of the account a in the above Step S122, the management server 300 uses the remittance and payment receipt processing section 388 to reduce by the amount of money to be received, the balance of account data of the account a of the user A, which balance is stored in the account data storage section 360, as well as to increase by the amount of money to be received, a balance of account data of the user B's account (hereafter, referred to as an "account b"), which balance is stored in the account data storage section 360 (Step S123). Then, the management server 300 invalidates the first and second access keys so that no more transaction may be performed using these access keys.

Here, there may be some cases where no electronic money account of the user B is set up in the management server 300 when Steps S101-S123 are performed. In this case, the user B may be prompted to create an electronic money account in a timely manner. For example, when the access keys are determined to correspond with each other, and the amount of money to be received is determined to be within the balance of the account a in Steps S121 and S122, the user B may be prompted to create an electronic money account on the terminal B. Specifically, a screen requiring selections of only a card type and a card name as in FIG. 11 is displayed on the terminal B, while a message confirming whether or not an electronic money card with a balance of zero yen is to be set up. If the user B creates an electronic money card according to such processing, an electronic money account for receiving the amount of money in the above Step S123 is created in the management server 300.

As described above, in the present embodiment, the terminal A as a first user terminal receives at least part of information on the second electronic certificate from the terminal B as a second user terminal in Step S101, and the terminal B receives at least part of information on the first electronic certificate from the terminal A in Step S103. Thus, after the terminals A and B exchange at least part of the information on their electronic certificates, the management server 300 receives the exchanged at least part of the information on the electronic certificates from the terminals A and B in Steps S107 and S108, respectively, and determines whether or not the received at least part of the information on the electronic certificates correspond with the information on the electronic certificates stored in the management server 300. In other words, since the electronic certificate information of itself is sent from the other terminal to the management server 300, and electronic certificate information of the other terminal is sent from itself to the management server 300, the two terminals which are about to perform a transaction are identified at this point, and the respectively sent electronic certificates are cross-checked by the management server 300. Accordingly, the management server 300 may ensure the authentication of the terminals A and B, which are about to perform the electronic money remittance and payment receipt.

Here, the first electronic certificate of the terminal A is unique information that only the terminal A and the management server 300 comprise, and the second electronic certificate of the terminal B is unique information that only the terminal B and the management server 300 comprise. Also, at least part of the information on the first electronic certificate is sent from the terminal B to the management server 300, and at least part of the information on the second electronic certificate is sent from the terminal A to the management server 300. Further, the management server 300 receives the at least part of the information on the electronic certificates from both of the terminals A and B to thereby authenticate the terminals which are about to perform the electronic money remittance and payment receipt. Thus, even if, for example, the terminal B obtains the terminal A's electronic certificate information illegally and somehow tries to obtain electronic money the user A owns, the electronic money will never be sent from the user A to the user B unless the terminal A sends its electronic certificate information to the management server 300.

Also as described previously, after authenticating the two terminals A and B which are about to perform the electronic money remittance and payment receipt, the management server 300 sends the access keys to the terminals A and B, respectively, and receives the instructions to send and receive the electronic money together with the access keys from the terminals A and B, respectively, in the present embodiment. Further, the management server 300 determines whether or not the access keys received from the terminals A and B correspond with each other before transferring the electronic money from the user A to the user B within the management server 300. As such, because of the determination before the issuance of the access keys and the determination of the access keys' correspondence, the electronic money may be safely transferred from the user A to the user B.

Also, since the electronic money of each of the users A and B is stored in the management server 300 in the present embodiment, even if, for example the terminal A is lost and may not be collected, the terminal loss alone does not result in a loss of the user A's electronic money.

Further, since the terminals A and B mutually exchange their electronic certificate contents, and send the instructions to send and receive electronic money together with the access keys issued by the management server 300 in the present embodiment, the user A may send the electronic money directly to the user B while ensuring the safety of electronic money transfer. Thus, the electronic money may be transferred in a way extremely similar to that using cash.

Note that the terminals A and B exchange part of their electronic certificates in the present embodiment, but the terminal A may send the first electronic certificate itself to the terminal B in the above Step S103, and the terminal B may send the second electronic certificate itself to the terminal A in the above Step S101.

Here, for example, two portable terminals for performing a mutual transaction may each have an embedded IC chip, which may have a security module certified by a predetermined certification authority, so that the authentication of the two portable terminals is performed based on contents of the security module of each of the portable terminals. In this case, however, if specifications of the security modules of the two terminals are different, the two terminals may not be able to decrypt each other's security module, making the mutual transaction prone to failure. In the present embodiment in contrast, in spite of having a simple configuration to issue an electronic certificate to each of the terminal A and B as well as owning the issued electronic certificates and their respective secret keys, the management server 300 enables safe transactions and has high usability in the real world in comparison to cases using security modules, as previously discussed.

Also in the present embodiment, an access key is issued to each of the terminals A and B after the access key requests are sent from both the terminals A and B in Steps S115 and S117. Thus, no transactions is possible with only one request from either the terminal A or B, making the present embodiment extremely advantageous to ensure the safety of electronic money transfers.

Further in the present embodiment, only the management server 300 has the secret keys of the first and second electronic certificates. Accordingly, even if the terminal A receives part of the second electronic certificate from the terminal B, the terminal A cannot decrypt the part of the electronic certificate. Likewise, even if the terminal B receives part of the first electronic certificate from the terminal A, the terminal B cannot decrypt the part of the electronic certificate. Thus, safety of the electronic money transfers is secured. Note that the management server 300 has the secret keys in association with the first and second electronic certificates in the present embodiment, but the secret keys may be included in the first and second electronic certificates which the management server 300 comprises.

Also in the present embodiment, the management server 300 may store the electronic money of the user A in association with a plurality of electronic money account numbers. In Step S119, the terminal A also sends the management server 300 the account number of the electronic money account from which the remittance is to be made. As such, the user A may own a plurality of electronic money account, and may select an electronic money account from which the remittance will be made. Thus, the user A may determine a usage for each of the user A's electronic money accounts, and make a remittance according to the usage.

In the present embodiment, the management server 300 also determines (3) whether or not the sender of the digital signature of the second electronic certificate is the terminal A (the terminal corresponding with the first electronic certificate), and (4) whether or not the sender of the digital signature of the first electronic certificate is the terminal B (the terminal corresponding with the second electronic certificate) in Step S112. Here, the terminal A replaces the digital signature of the first electronic certificate that the terminal A owns, with the digital signature of the received second electronic certificate in Step S105, and the terminal B replaces the digital signature of the second electronic certificate that the terminal B owns, with the digital signature of the received first electronic certificate in Step S106. Accordingly, the determination in Step S112 may be performed by comparing parts other than the digital signature of the first and second electronic certificates with the replaced digital signature, respectively; and parts other than the digital signature of the first and second electronic certificates stored in the customer master storage section 350, and therefore, the present embodiment is efficient, and extremely advantageous to ensure the safety of electronic money transfers.

Further, the management server 300 invalidates the first and second access keys so that no more transaction may be performed using the first and second access keys. Thus, the present embodiment has an extremely advantageous configuration to ensure the safety of electronic money transfers.

Furthermore, in the present embodiment, the near field communication section 150 and the reader/writer 250 may communicate with each other only when a distance between them is several cm to ten and several cm, but they may not communicate when the distance is over ten and several cm. For that reason, when the terminals A and B attempt a mutual transaction, erroneous exchange of electronic certificates between wrong terminals are unlikely to occur, making the present embodiment extremely advantageous to ensure transaction safety.

Note that the terminal B is a POS terminal in the present embodiment, the terminal B may be a mobile phone similar to the terminal A. In that case, the reader/writer 250 of the terminal B is a near field communication section, and the input device 260 is a touch panel-type input device. Thus, even when the terminal B is configured as a mobile phone, the processing of the above Steps S101-S123 may be used to purchase the product X. Moreover, if the terminals A and B are configured as mobile phones, the users A and B may perform a purchase and sales transaction for the product X anytime anywhere. For instance, when the product X is a fruit harvested at a farm owned by the user B, or when the users A and B run into each other on the street and like to make a purchase and sales transaction for the product Y, the user A may make an electronic money payment to the user B.

For example, if the management server 300 and the application are configured so that they may enter sales prices (amounts of money that the user B likes to receive from the user A) for the products X and Y on the display device 230 of the terminal B of the user B, the terminal B may function in a similar way to the terminal B as the POS terminal. Then, the processing of the above Steps S101-S123 may be performed by bringing the near field communication section 150 of the terminal A and the reader/writer 250 of the terminal A close to each other, and by the user A pressing the Pay button of FIG. 14.

In addition to the case of the purchase and sales of products X and Y, the user B may receive an amount of electronic money from the user A with the processing of the above Steps S101-S123 if the display device 230 of the user B is configured so that the amount may be entered on the display device 230.

Note that, the management server 300 stores the electronic money of the users A and B in association with the electronic money cards in the present embodiment. On the other hand, if an electronic money wallet, an electronic money folder or the like is set up in the management server 300 as an electronic money account of the users A and B, the management server 300 may store the electronic money of the users A and B in association with the electronic money wallet, the electronic money folder or the like.

Note that the above Step S101 is initiated by operating on the Pay button on the display screen 130 of the terminal A in the present embodiment. Whereas, the near field communication section 150 of the terminal A and the reader/writer 250 of the terminal B may be configured so that Step S101 automatically starts when the near field communication section 150 and the reader/writer 250 are brought near each other within a distance of several cm to ten and several cm, or other trigger may configured to initiate Step S101.

Note that the terminals A and B exchange part of each other's electronic certificate via the near field communication in the above Steps S101 and S103 in the present embodiment. On the other hand, the terminals A and B may also exchange part of each other's electronic certificate via mobile networks and the Internet in the above Steps S101 and S103.

In the present embodiment, if all of the above (1)-(4) are determined to be matches in Steps S111 and S112, the access keys are used to further secure the transaction in Steps S113-S121. Whereas, the electronic money transfer from the user A to the user B is still possible with Steps S113-S118 omitted, with the access key transmissions omitted Steps S119 and S120, and with the determination in Step S121 omitted. In other words, since the access keys are used to further secure the transactions, the access keys may be omitted for simple transactions, for example. Even when the access keys are not used, the electronic money may be securely transferred from the user A to the user B since the authentication of terminals mutually conducting a transaction is ensured in Steps S111 and S112.

Further, even if Step S111 is omitted, the electronic money may be transferred from the user A to the user B. This is because Step S112 alone may confirm the terminals conducting the transaction.

Below, an electronic money transfer system according to a second embodiment of the present invention will be discussed. This system basically comprises an equivalent configuration to that of the first embodiment, but the terminal B is a mobile phone similar to the terminal A. Accordingly, the reader/writer 250 of the terminal B is a near field communication section, and the input device 260 is a touch panel-type input device.

In this system, an example of processing performed by a terminal A, a terminal B and a management server 300 (see FIG. 15) will be used to discuss a case where the user A (a money-sending side) sends electronic money to the user B (a money-receiving side). The case where the user A (the money-sending side) sends electronic money to the user B (the money-receiving side) may include, for example, when the user A gives some allowance to the user B, or when the user A lends some electronic money to the user B. Below, a case is discussed where the user A lends 300 yen to the user B. In the present embodiment, the management server 300 and the application, among others, display a screen such as one shown in FIG. 16 on a display screen 130 of a terminal A of the user A, and this screen is configured to allow the user A to enter an amount of money to be sent. In the following discussion, it is assumed that the amount has been already entered.

Figure 16:
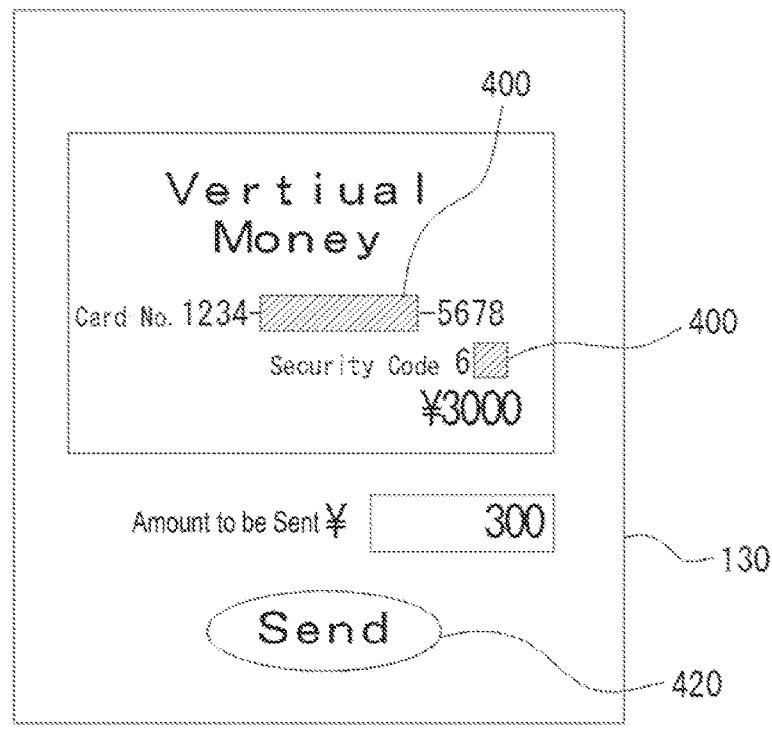
FIG. 16 is another example of the display screen of the display device.
Figure 15:
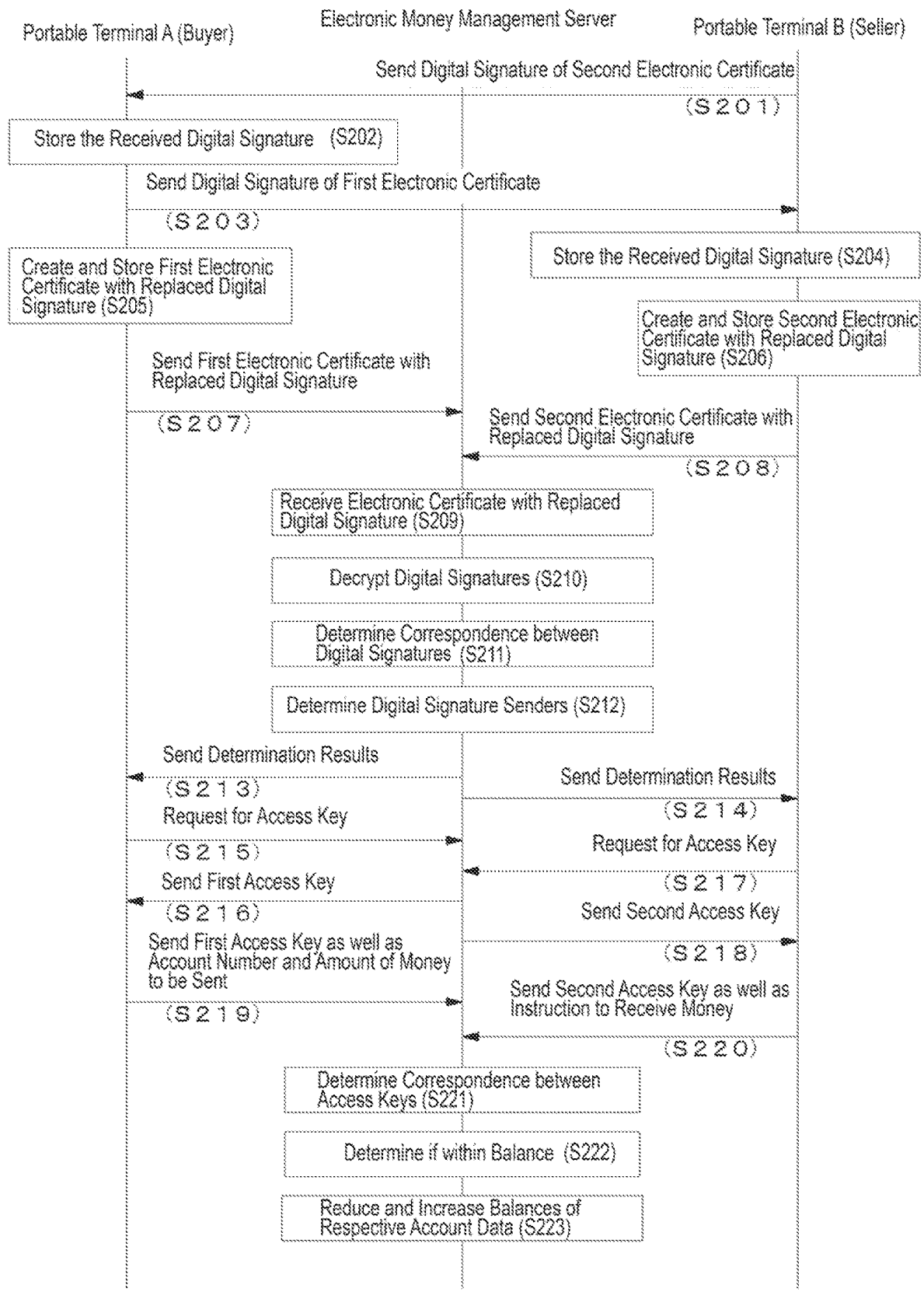
FIG. 15 is another flowchart showing processing in the terminal A, the terminal B and the electronic money management server.

First, Steps S201-S223 of FIG. 15 are performed when near field communication sections 150 and 250 of the terminals A and B are brought near each other, and a Send button 420 of FIG. 16 is touched by a finger. Here, processing in Steps S201-S218 is equivalent to that in Steps S101-S118 of the first embodiment, and therefore omitted from the discussion below.

After Step 218, the terminal A uses a remittance and payment receipt request processing section 185 to send a first access key, an instruction to send money to the user B as an owner of the terminal B, an account number of an electronic money account (a card number of the electronic money card, which card number is indicated on the display device 130) from which the remittance is to be made, and an amount of money to be sent, 300 yen, to the management server 300 (Step S219), and the management server 300 receives them by a remittance and payment receipt request reception processing section 387. Whereas, the terminal B uses a remittance and payment receipt request processing section 285 to send a second access key and an instruction to receive money, to the management server 300 (Step S220), and the management server 300 receives them by a remittance and payment receipt request reception processing section 387. Here, the terminal B may also send the management server 300 an account number of an electronic money account to which the remittance is to be made.

Next, the management server 300 uses the remittance and payment receipt request reception processing section 387 to determine whether or not the access key received from the terminal A and the access key received from the terminal B correspond with each other (Step S221). Also, the management server 300 uses the remittance and payment receipt request reception processing section 387 to determine whether or not the amount of money to be sent is within a balance of the user A's account, which balance is stored in an account data storage section 360 of the management server 300, more specifically, whether or not the amount of money to be sent is within a balance of the account of the user A (hereafter, referred to as an "account a") (Step S222).

Next, if the access keys are determined to correspond with each other in the above Step S221, and if the amount of money to be sent is determined to be within the balance of the account a in the above Step S222, the management server 300 uses a remittance and payment receipt processing section 388 to reduce by the amount of money to be sent, the balance of account data of the account a of the user A, which balance is stored in the account data storage section 360, as well as to increase by the amount of money to be sent, a balance of account data of the user B's account (hereafter, referred to as an "account b"), which balance is stored in the account data storage section 360 (Step S223). Then, the management server 300 invalidates the first and second access keys so that no more transaction may be performed using these access keys.

With such a configuration, the present embodiment enables operational effects similar to those of the first embodiment, and various changes may also be made as previously discussed concerning the first embodiment.

Below, an electronic money transfer system according to a third embodiment of the present invention will be discussed. This system basically comprises an equivalent configuration to that of the second embodiment.

In this system, an example of processing performed by a terminal A, a terminal B and a management server 300 (see FIG. 17) will be used to discuss a case where the user A (a sending side) sends electronic money to the user B (a receiving side). Below, a case is discussed where the user A sends an electronic money card for 3000 yen to the user B. In the present embodiment, the management server 300 and the application, among others, display a screen such as one shown in FIG. 18 on a display screen 130 of a terminal A of the user A, and this screen is configured to allow the user A to instruct the transmission of the displayed electronic money card.

Figure 17:
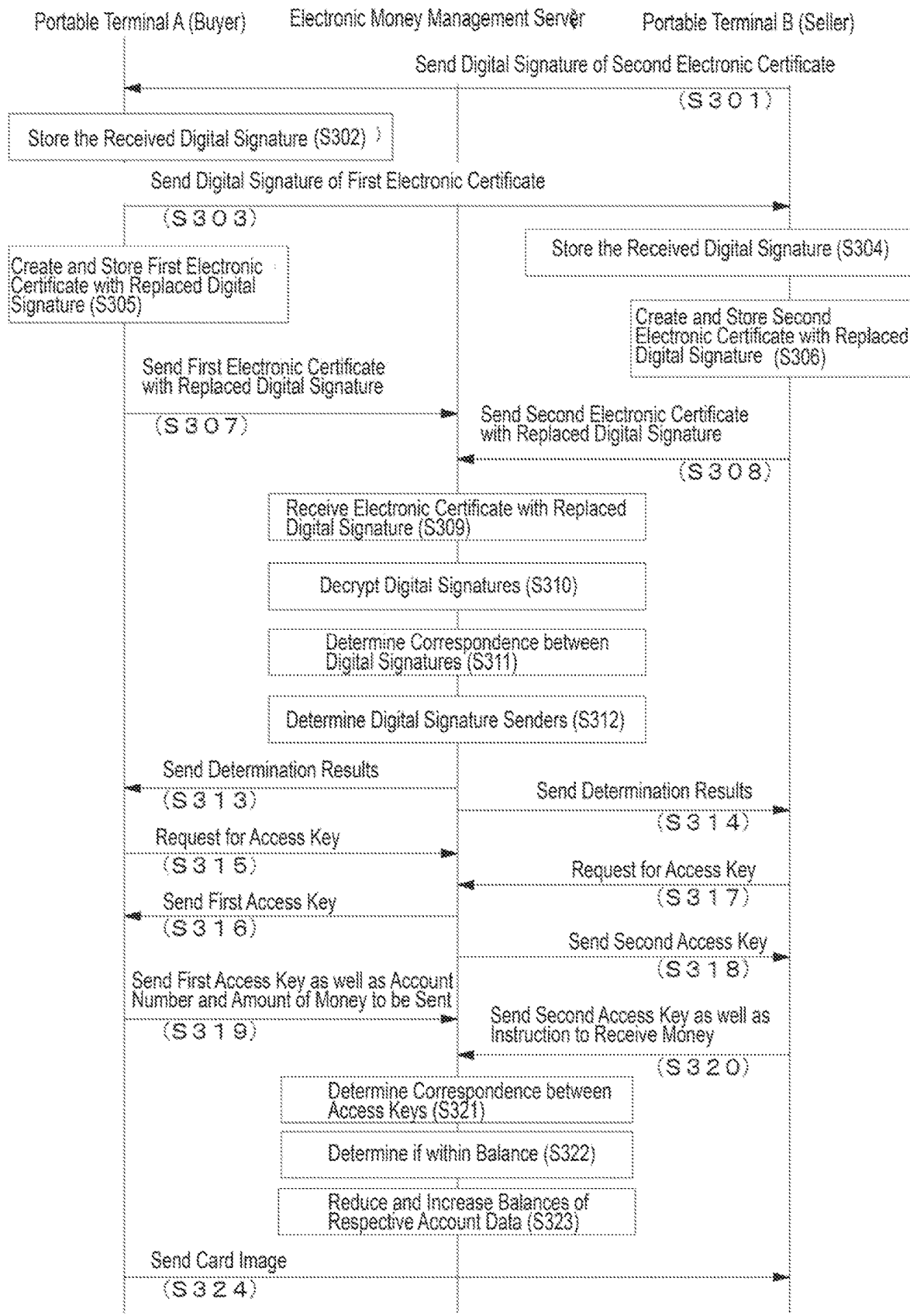
FIG. 17 is another flowchart showing processing in the terminal A, the terminal B and the electronic money management server.
Figure 18:
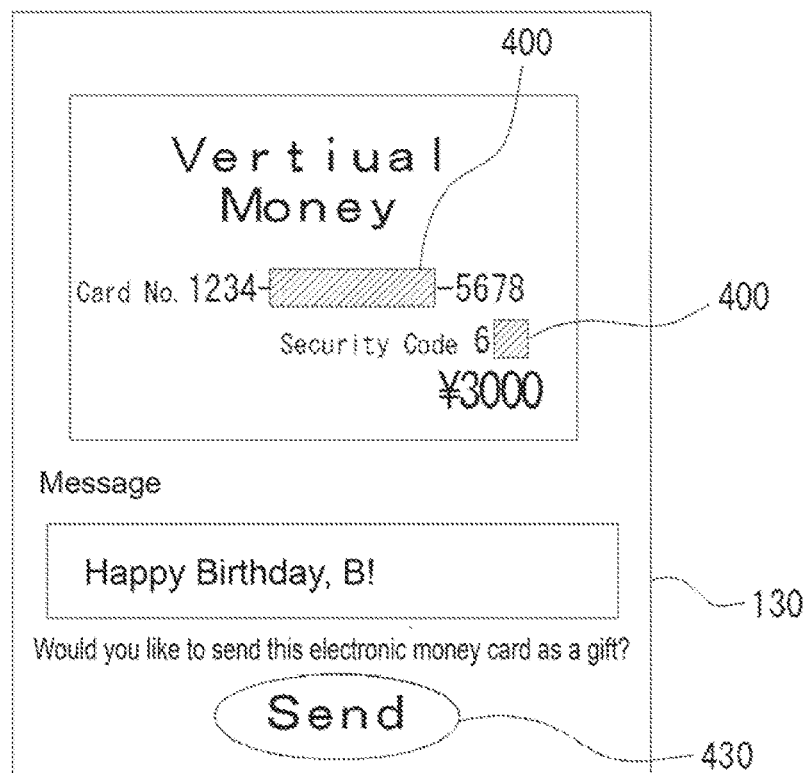
FIG. 18 is another example of the display screen of the display device.
Figure 19:
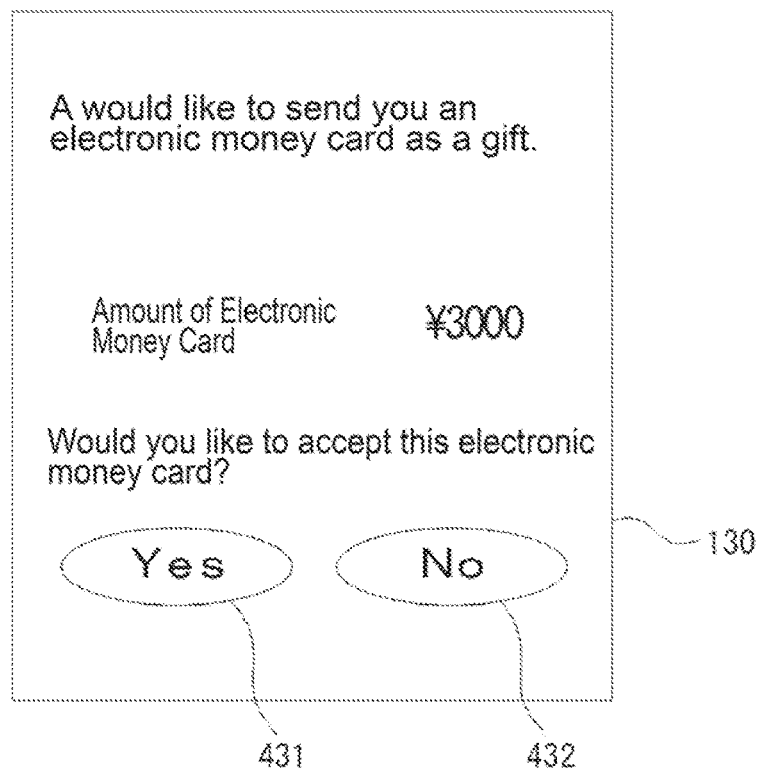
FIG. 19 is another example of the display screen of the display device.

First, when near field communication sections 150 and 250 of the terminals A and B are brought near each other, and a Send button 430 of FIG. 18 is touched by a finger, the management server 300 and the application, among others, display on a display device 230 of a terminal B, information on the amount of the electronic money card being displayed on the terminal A, and buttons with which selections may be made whether or not to receive the amount (see FIG. 19). At this point, if a Yes button 431 on the display device 230 of the terminal B is touched by a finger, Steps S301-S324 of FIG. 17 are performed. Here, processing in Steps S301-S318 is equivalent to that in Steps S201-S218 of the second embodiment, and therefore omitted from the discussion below.

After Step S318, the terminal A uses a remittance and payment receipt request processing section 185 to send a first access key, an instruction to send money to the user B as an owner of the terminal B, an account number of an electronic money account (a card number of the electronic money card, which card number is indicated on the display device 130) from which the remittance is to be made, and an amount of money to be sent, which is an entire balance of the electronic money card, to the management server 300 (Step S319), and the management server 300 receives them by a remittance and payment receipt request reception processing section 387. Note that, in Step S319, the instruction from the user A to the management server 300 to transfer the electronic money card in question to the terminal B is performed by sending to the management server 300, the account number of the electronic money account from which the remittance is to be made, and the entire balance of the electronic money card, as described earlier.

Whereas, the terminal B uses a remittance and payment receipt request processing section 285 to send a second access key and an instruction to receive money, to the management server 300 (Step S320), and the management server 300 receives them by a remittance and payment receipt request reception processing section 387.

Next, the management server 300 uses the remittance and payment receipt request reception processing section 387 to determine whether or not the access key received from the terminal A and the access key received from the terminal B correspond with each other (Step S321). Also, the management server 300 uses the remittance and payment receipt request reception processing section 387 to determine whether or not the amount of money to be sent is within a balance of the user A's account, which balance is stored in an account data storage section 360 of the management server 300, more specifically, whether or not the amount of money to be sent is the entire balance of the account of the card number (account number) displayed on the display screen 130 of the terminal A (hereafter, referred to as an "account a") (Step S322).

Next, if the access keys are determined to correspond with each other in the above Step S321, and if the amount of money to be sent is determined to be the entire balance of the account a in the above Step S322, the management server 300 uses a remittance and payment receipt processing section 388 to reduce by the amount of money to be sent, the balance of account data of the account a of the user A, which balance is stored in the account data storage section 360, as well as to newly configure an electronic money account for the user B (hereafter, referred to as an "account b") in the account data storage section 360, and increase a balance of account data of the account b by the amount of money to be sent (Step S323). In the present embodiment, the account a is deleted from the account data storage section 360 after Step S322, and the account number of the deleted account a becomes an account number of the account b in Step S323. Then, the management server 300 invalidates the first and second access keys so that no more transaction may be performed using these access keys.

Figure 20:
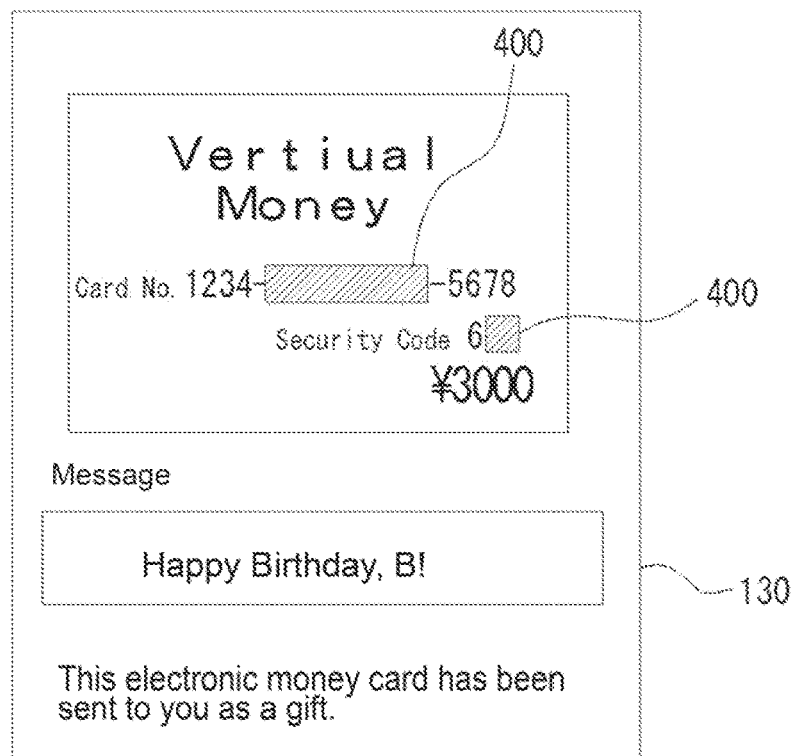
FIG. 20 is another example of the display screen of the display device.

Next, the terminal A sends a card image of the account A to the terminal B through near field communication, mobile networks and the like (Step S324). After this, the management server 300 and the application, among others, display a screen such as one shown in FIG. 20 on the display device 230 of the terminal B.

With such a configuration, the present embodiment enables operational effects similar to those of the first embodiment, and various changes may also be made as previously discussed concerning the first embodiment.

Also, since the terminals A and B mutually exchange their electronic certificate contents, and send the instructions to send and receive electronic money together with the access keys issued by the management server 300, the user A may send the electronic money card directly to the user B while ensuring safety of the electronic money transfer. Thus, the electronic money card may be transferred in a way extremely similar to that using a real card.

Note that the electronic money card shown in each of the above embodiments may be used for typical Internet shopping as well. For example, when the user A uses a PC to visit an Internet shopping website enabled for the electronic money and make a payment for a product of choice, the user A may purchase the product by entering a card number, a security code and the like of an electronic money card the user A owns in a similar way to that of a credit card payment. During this settlement, an operator of the Internet shopping website sends a query to the management server 300, where processing is performed to determine the balance of the card number and the like.

Further, when the user A is logged in with the terminal A and a post-login member screen is displayed on the display screen 130 of the terminal A by the application and the like, the user A may display the Internet shopping web site via the application, and use the electronic money card to purchase a product offered at the website. In this case, when the user A makes a payment at the Internet shopping website, the application and the management server 300, among others, display a screen such as one shown in FIG. 21 on the display screen 130 of the terminal A. As described earlier, the screen of FIG. 21 also accepts the card number, the security code and the like of the electronic money card.

Figure 21:
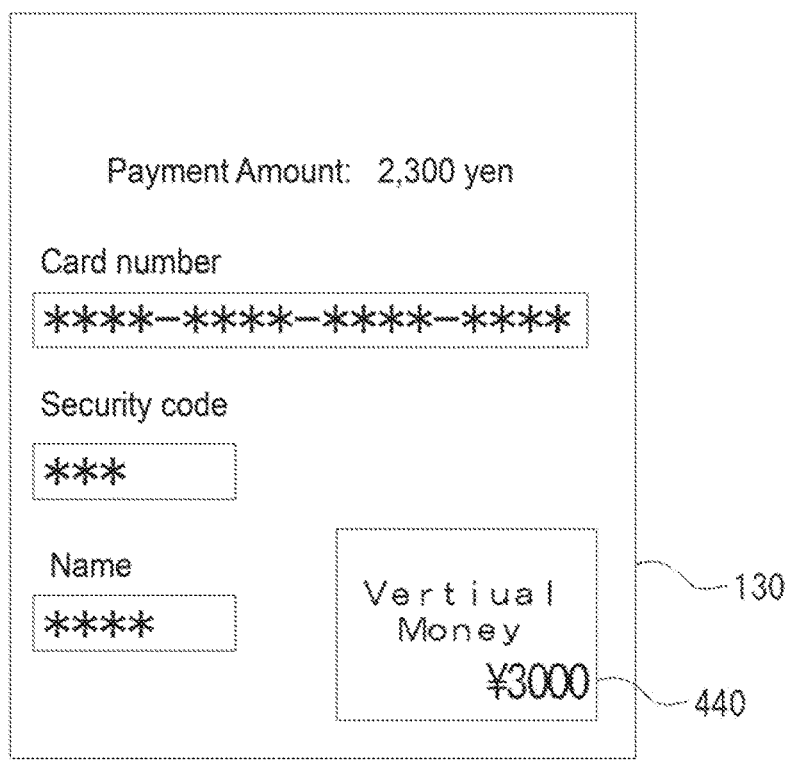
FIG. 21 is another example of the display screen of the display device.
Figure 22:
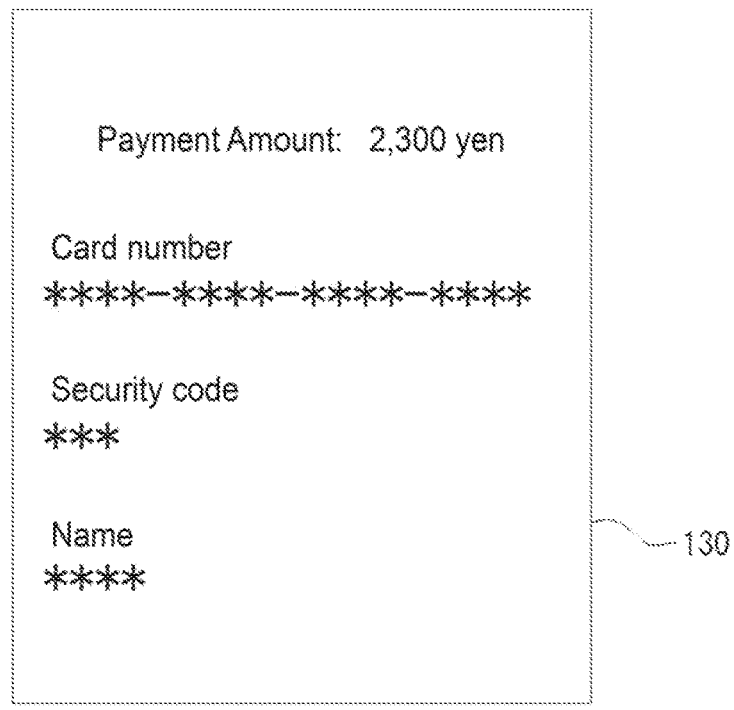
FIG. 22 is another example of the display screen of the display device.
Figure 23:
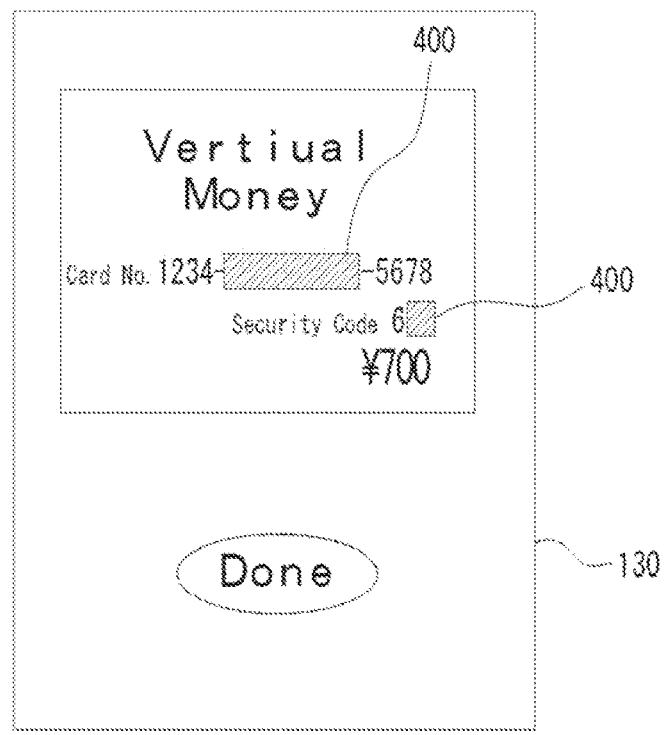
FIG. 23 is another example of the display screen of the display device.

However, since the user A has already logged in using the user A's login ID, password and the like, the possibility of unauthorized usage of the electronic money card has been lowered at this point. Also, since the electronic money card is of prepaid type, an amount of damage caused through this electronic money card is limited. Thus, a button 440 is displayed for indicating information of the electronic money card in the lower right corner of the screen, as shown in FIG. 21, and if the button 440 is touched by a finger, screens shown in FIGS. 22 and 23 will appear on the display screen 130 without the user A entering the card number, the security code and the like of the electronic money card. On the screen of FIG. 22, the card number, the security code and the like, which the use A should have entered, are already displayed. In other words, the settlement may be performed without entering the card number, the security code and the like of the electronic money card.

Note that the terminal B directly communicated with the management server 300 in the first embodiment. The terminal B, however, may also communicate with the management server 300 via a system of a card company such as JCB® or VISA® to perform steps such as the above Steps S101-S123. In this case, the system of a card company may only relay the communication between the terminal B and the management server 300, or may function in place of the management server 300 or the terminal B in one or more step of Steps S101-S123. Further, the system of a card company and the management server 300 may be substantially integrated to function together. As such, when a transaction is performed through the system of a card company, or when the system of a card company and the management server 300 are substantially integrated to function together, the electronic money card may be used at member stores of the card of the card company.

Figure 24:
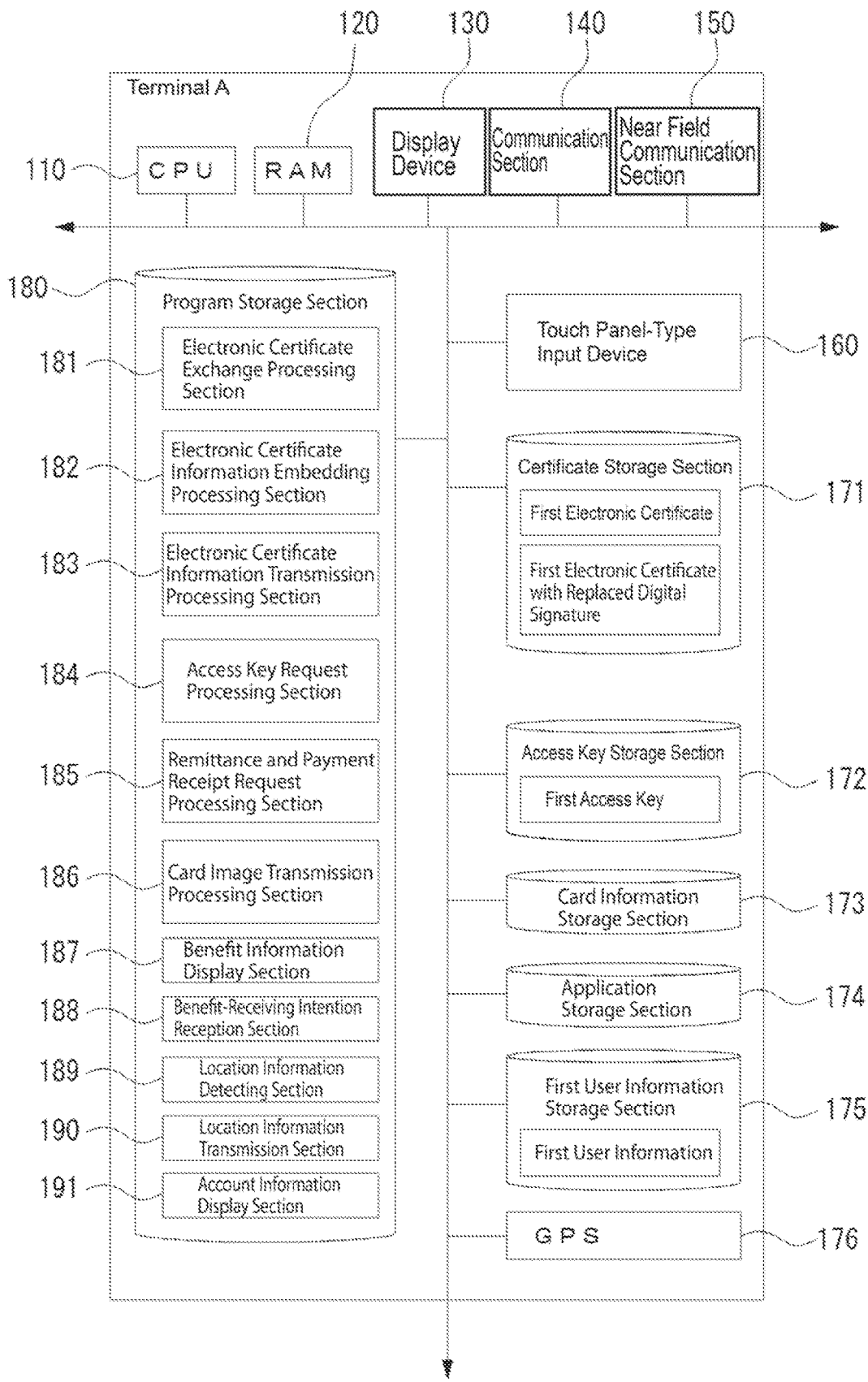
FIG. 24 is another schematic structural view of the terminal A.
Figure 25:
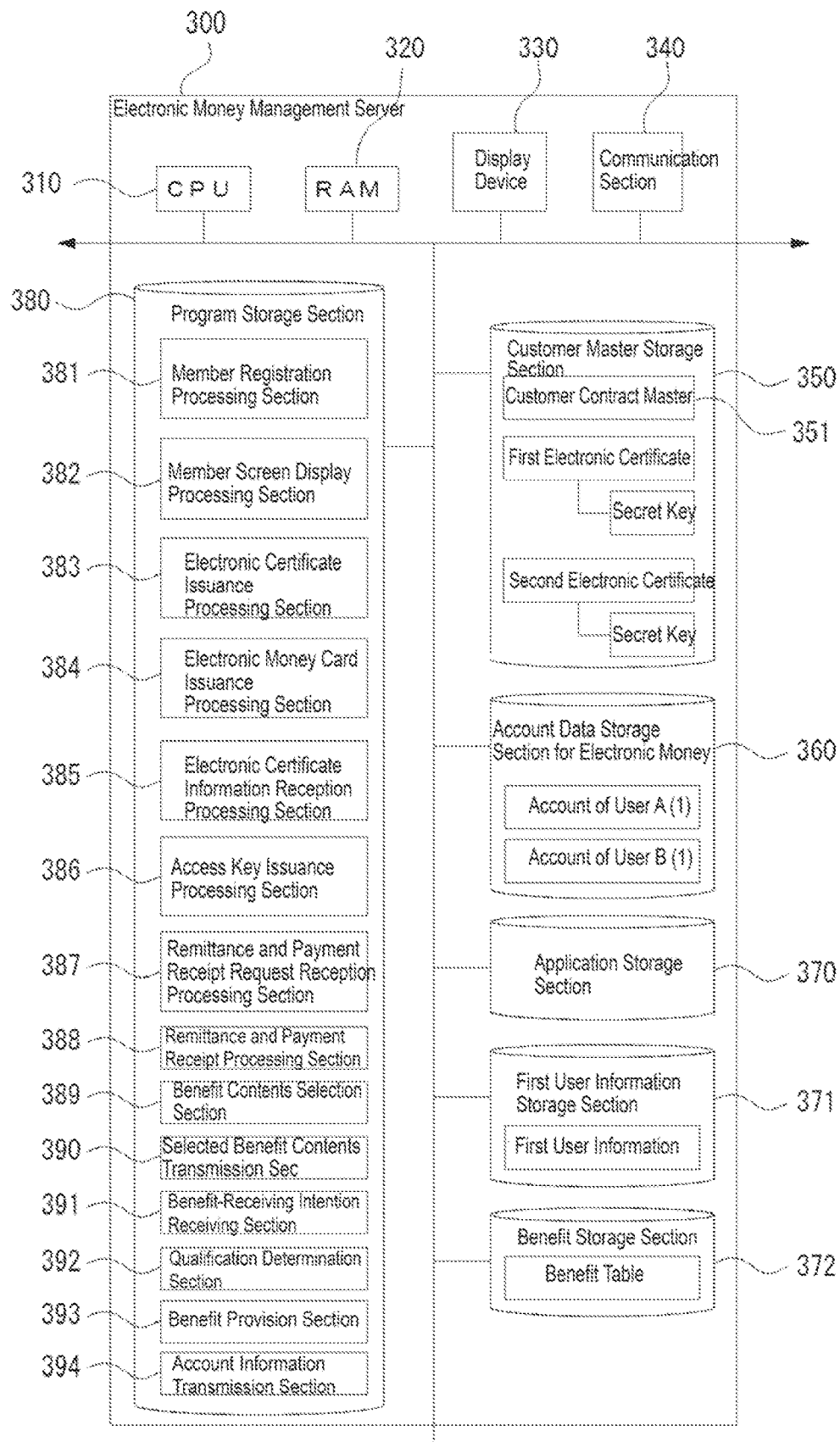
FIG. 25 is another schematic structural view of the electronic money management server.

Below, an electronic money transfer system according to a fourth embodiment of the present invention will be discussed. A basic configuration of this system is similar to that of the second embodiment, and a terminal A and a management server 300 are configured as in FIGS. 24 and 25.

The terminal A of the present embodiment comprises a first user information storage section 175 and a GPS 176, and also comprises in a program storage section 180, a benefit information display section 187, a benefit-receiving intention reception section 188, a location information detecting section 189, a location information transmission section 190 and an account information display section 191, each of which causes the terminal A to perform predetermined actions.

The first user information storage section 175 stores first user information, which comprises at least an account number of an electronic money account of a user A (a first user), or user A-specific information such as a name and a date of birth of the user A in association with the account number, or first user terminal-specific information, which is specific to the terminal A (a terminal of the first user), such as individual information of the terminal A of the user A.

Figures 26, 27:
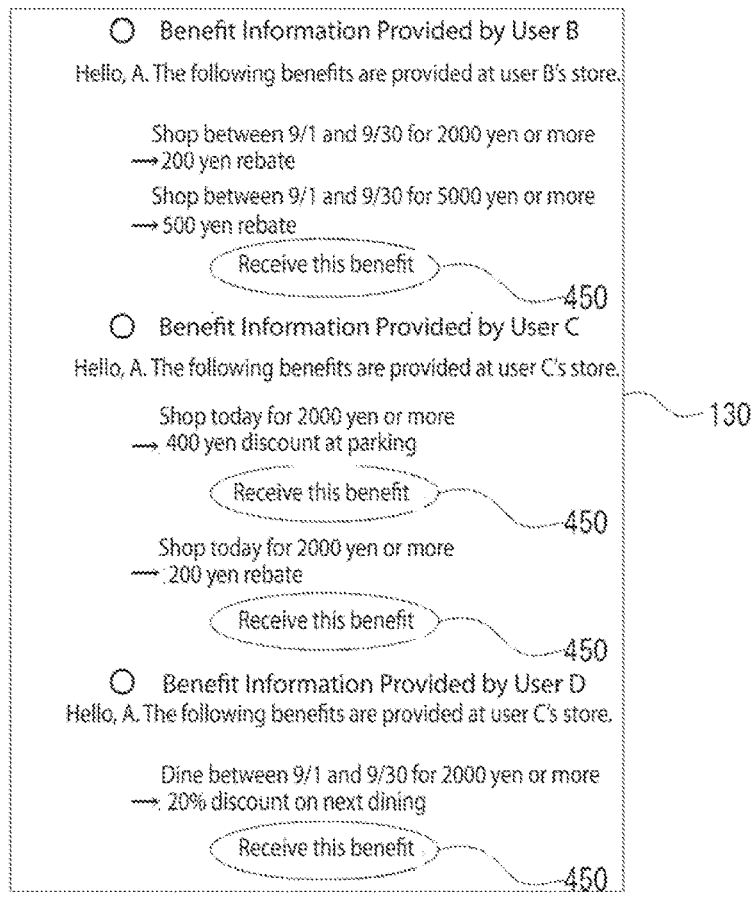
FIG. 26 is another example of the display screen of the display device.
FIG. 27 is another example of the display screen of the display device.

The benefit information display section 187 displays on a display screen 130 of the terminal A, benefit information sent by a selected benefit contents transmission section 390, which will be described below. For example, the benefit information is displayed on the display device 130, as shown in FIG. 26. The displayed benefit information may include one or more benefit information items, only benefit information which a user B provides to a customer, or both benefit information which the user B provides to the customer and which other users provide to the customer. In FIG. 26, both benefit information which the user B provides to the customer and which other users provide to the customer are displayed simultaneously.

If, for example, the user operates a "Receive this benefit" button 450 shown in FIG. 26, the benefit-receiving intention reception section 188 receives the operation via a touch panel-type input device 160, and sends the received intention of the user to the management server 300. Also, in some cases, the benefit-receiving intention reception section 188 sends part or all of the first user information stored in the first user information storage section 175 to the management server 300.

The location information detecting section 189 is in coordination with map information, and identifies a location of the terminal A within the map information based on location information of the terminal A detected by GPS 176. Also, the location information transmission section 190 sends the management server 300, the location information of the terminal A within the map information identified by the location information detecting section 189.

The account information display section 191 displays on a display screen 130 of the terminal A, account information sent by an account information transmission section 394, which will be described below. For example, the account information of electronic money of the user A is displayed on the display device 130, as shown in FIG. 27.

The management server 300 of the present embodiment comprises a first user information storage section 371 for storing the same first user information as that of the first user information storage section 175, and a benefit storage section 372 for storing contents of and qualifications for benefits provided by the user B (a second user) and other users; whereas, a program storage section 380 comprises a benefit contents selection section 389, the selected benefit contents transmission section 390, a benefit-receiving intention receiving section 391 for receiving an intention of the user sent by the benefit-receiving intention reception section 188, a provision determination section 392, a benefit provision section 393 and an account information transmission section 394, each of which causes the management server 300 to perform predetermined actions.

The benefit storage section 372 stores the contents of and qualifications for the benefits provided by the user B and other users, as shown in FIG. 28. In FIG. 28, the user B provides cash rebate benefits each of which is determined according to an amount paid at a store of the user B; the user C provides a cash rebate benefit determined according to an amount paid at a store of the user C, and a parking fee discount at a parking operated by an organization other than the user C; and the user D provides a one-time discount benefit for future dining, determined according to an amount paid at a store of the user D. Also, as shown in FIG. 28, conditions for distributing benefit information are configured for each benefit, wherein for the benefits provided by the user B, for example, the conditions include an age, a number of historical transactions conducted at the store of the B and a geographical area.

The benefit contents selection section 389 selects benefit contents suitable for the user based on, among others, part of the first user information sent by the benefit-receiving intention reception section 188, and the location information sent by the location information transmission section 190. For example, if the location information transmission section 190 sends information that the user A is near a department store a or a station b; if the benefit-receiving intention reception section 188 sends an account number as part of the first user information of the user A; and if the user A's age and gender stored in association with the account number in the first user information storage section of the server 300 are 28 years old and male, respectively, the five sets of conditions for distributing benefit information, as shown in FIG. 28, are met, and these five sets of conditions are selected. Note that, when the benefits are selected, their respective conditions may include the number of historical transactions conducted at the store in question, and as in the benefits provided by the user B in FIG. 28, the conditions may be configured so that the benefits may be provided to users who conducted three or more transactions at the store of the B in the past. Further, a priority rate may be given to each benefit stored as in FIG. 28, and changed according to a benefit provision service fee which each benefit-providing user paid to a company operating the management server 300 to thereby change a selection priority according to the priority rate; change a priority order in which each benefit is sent by the selected benefit contents transmission section 390; and/or change a priority order in which each benefit is displayed and a position where each benefit is displayed by the benefit information display section 187.

The selected benefit contents transmission section 390 sends the terminal A benefit information for the benefit contents selected by the benefit contents selection section 389.

Figure 29:
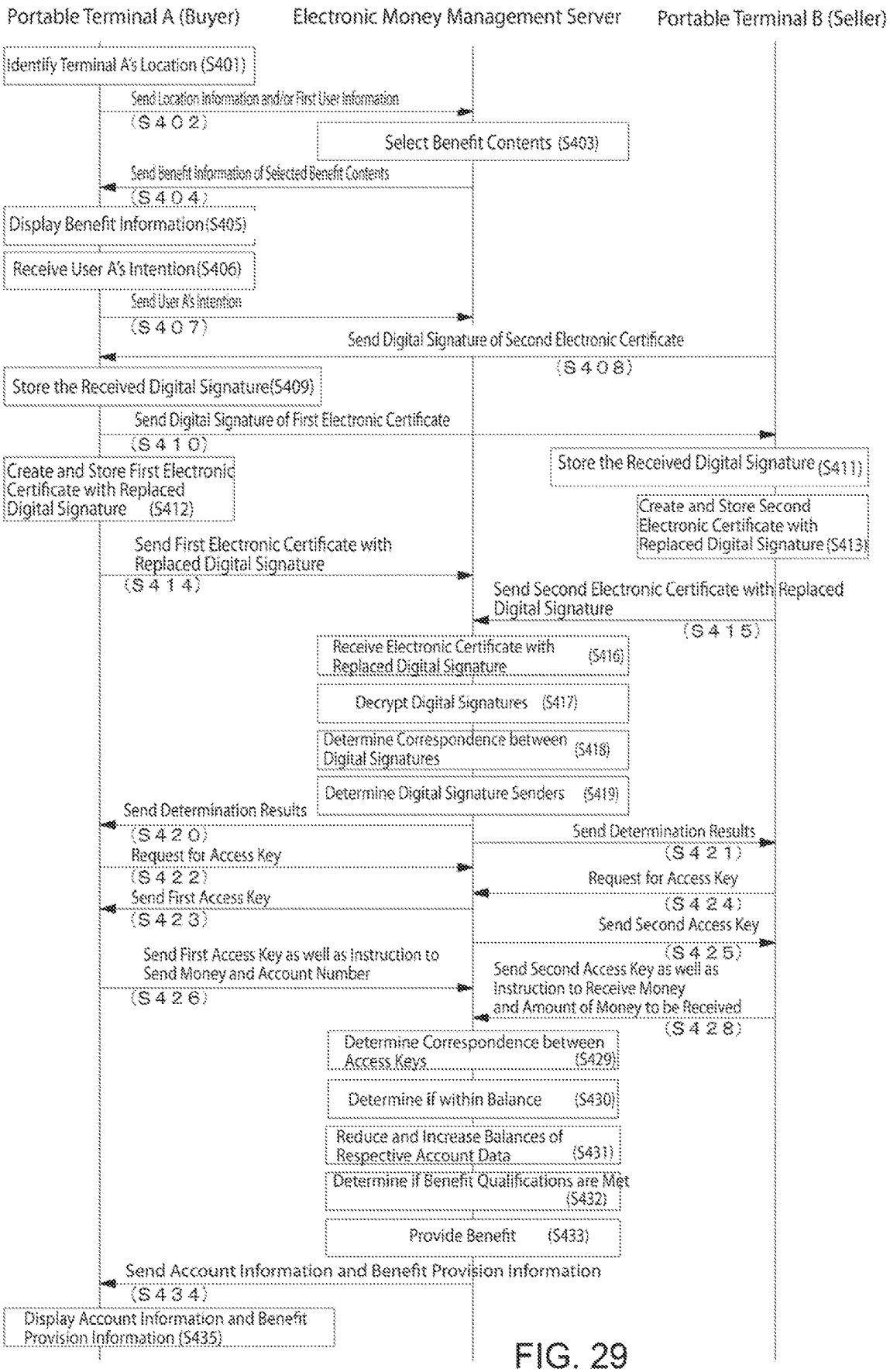
FIG. 29 is another flowchart showing processing in the terminal A, the terminal B and the electronic money management server.

Operations of the provision determination section 392, the benefit provision section 393 and the account information transmission section 394 will be discussed below with reference to examples of processing performed by the terminal A, the terminal B and the management server 300 (see FIG. 29). Similarly to the first embodiment, FIG. 29 describes processing in a case where the user A (a buyer) purchases a product from the user B (a seller such as a store), and pays for the product with the electronic money.

First, before the user A visits a store of the user B, the terminal A detects its location using the location information detecting section 189 (Step S401), and sends the identified location information to the management server 300 (Step S402). The management server 300 receives the location information of the terminal A, and uses the benefit contents selection section 389 to select benefit contents suitable for the user A from a benefit table stored in the benefit storage section 372 (Step S403), and uses the selected benefit contents transmission section 390 to send the terminal A the benefit information of the selected benefit contents (Step S404). This transmission may be performed by sending display data to be displayed by a browser on the terminal A, or by sending an e-mail.

The terminal A receives the information sent in Step S404, and uses the benefit information display section 187 to display the information sent via an e-mail, for example, on the display screen 130 as shown in FIG. 26 (Step S405). Also, if the user A operates the "Receive this benefit" button 450 shown in FIG. 26, for example, the benefit-receiving intention reception section 188 receives the operation via the touch panel-type input device 160 (Step S406), and sends the received intention of the user A to the management server 300 (Step S407), which uses the benefit-receiving intention receiving section 391 to receive the user intention and store it in a memory. Here, the user A selected a benefit provided by the user B, as in FIG. 26.

Thereafter, similarly to the first embodiment, the user A decides to purchase a product X at the store of the user B, and Steps S408-S431 are performed in a similar manner to Steps S101-123 of the first embodiment. Note that, in the present embodiment, the terminal A sends the account number of the user A as the first user information of the user A, and the management server 300 stores the first user information in the memory in Step S426.

Then, the management server 300 uses the provision determination section 392 to determine whether or not the benefit qualifications are met by comparing an amount of money to be received in Step 428, at least one of amounts of electronic money increase or decrease in the above Steps S414, S415, S418, S419, S426, S428, S429, S430 or S431, and in Step S431, and qualifications of a benefit selected by the user A (Step S432).

Next, if the management server 300 has received the user A's intention to receive the benefit from the user B in Step S407, and if the qualifications are determined to be met in Step S432, the management server 300 uses the benefit provision section 393 to provide the benefit to the electronic money account of the user A according to the benefit contents (Step S433). For example, as shown in the account information of the user A in FIG. 27, 2500 yen was paid at the user B's store on Sep. 10, 2012, and in response, a cash rebate of 200 yen was deposited. Here, the present embodiment may be configured in such a way that the user A's account number is sent from the terminal A to the management server 300 as the first user information of the user A in Step S407; it is determined whether or not the account number corresponds with the account number sent in Step S426 in Step S432; and the above Step S433 is performed if these two account numbers correspond with each other. In this case, the benefits are more accurately provided.

Next, the management server 300 uses the account information transmission section 394 to send the account information of the electronic money account of the user A to the terminal A together with benefit provision information, which is information of the benefit provided in the above Step S433 (Step S434), and the terminal A uses the account information display section 191 to display the account information of the user A's account as well as the benefit provision information, as shown in FIG. 27, for example (Step S435).

Thus, according to the present embodiment, since the benefit information is displayed on the user A's terminal based on attributes of the user A (age and gender), the location information of the terminal A owned by the user A and the like, the user A's effort and time to search for the benefit information relevant to the user A is eliminated, and also the user B may effectively notify the user B's benefit information to the user B's customers. Also, the present embodiment is configured so that the benefit is provided to the user A's account if the user A's intention to receive the benefit is received in Step S406; and later if they user A makes a payment at the user B's store to meet the benefit qualification, for example; therefore, the benefit provision and contents will be recognized and remembered by the user A more than when, for example, a benefit is provided automatically without the user A being unaware of receiving the benefit or its contents. This may contribute to increase the user A's motivation to purchase products, and strengthen an impression that the user B's store, for example, makes on the user A. Further, the information on the provided benefit displayed on the display screen 130 of the terminal A helps reinforce the user A's memory of the benefit receipt and contents.

Note that the present embodiment enables operational effects similar to those of the first embodiment, and various changes may also be made as previously discussed concerning the first embodiment.

Also, in the first and fourth embodiments, the digital signature of the first electronic certificate is sent from the terminal A to the terminal B, embedded in the second electronic certificate in the terminal B, and sent to the management server 300 in the second electronic certificate (Step S103, S104, S106, S108, S410, S411, S413, S415, etc.). Whereas, the digital signature of the first electronic certificate may be configured not to be sent from the terminal A to the terminal B.

Figure 30:
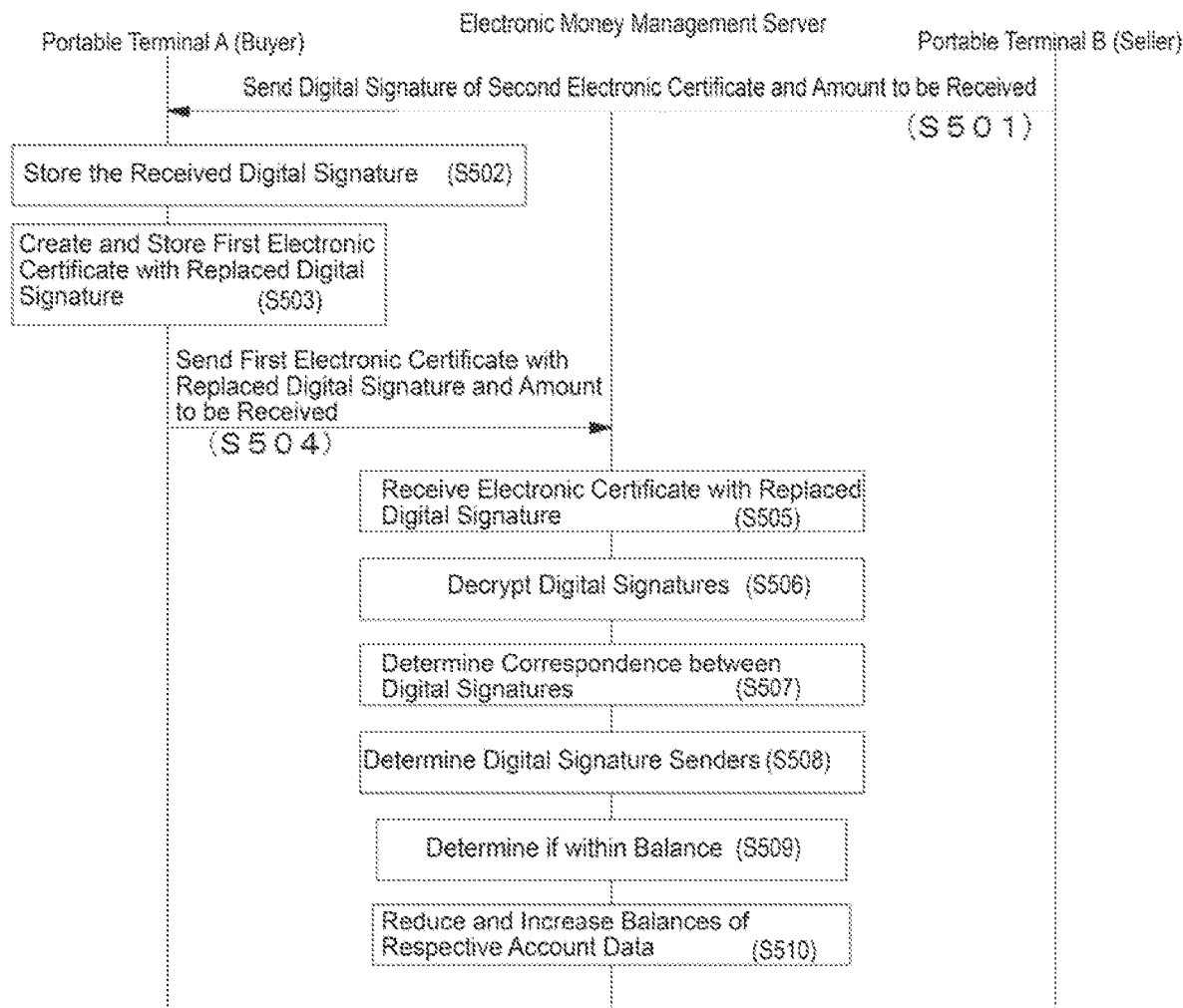
FIG. 30 is another flowchart showing processing in the terminal A, the terminal B and the electronic money management server.

Specifically, processes are performed as shown in FIG. 30. Similarly to the first embodiment, a case will be discussed below, where a user A decides to purchase a product X and takes it to a terminal B (POS terminal) of a user B.

First, when the terminal A is brought near a reader/writer 250 of the terminal B and a Pay button 410 of FIG. 14 is touched by a finger, the terminal B uses an electronic certificate exchange processing section 281 to send a digital signature in a second electronic certificate to the terminal A with near field communication, and also sends the user A an amount of money to be received from the user A, 300 yen, which is received by the user A (Step S501). Then, the terminal A stores the received digital signature in its certificate storage section and other sections of the terminal A's memory (Step S502).

Continuing, the terminal A uses an electronic certificate information embedding processing section 182 to replace the digital signature of a first electronic certificate that the terminal A owns, with the digital signature of the received second electronic certificate to thereby create and store in a certificate storage section 171, a first electronic certificate with the replaced digital signature (Step S503). Next, the terminal A uses an electronic certificate information transmission processing section 183 to send the management server 300, the first electronic certificate with the replaced digital signature as well as the amount of money to be received (Step S504).

Subsequently, the management server 300 uses an electronic certificate information reception processing section 385 to receive the first electronic certificate with the replaced digital signature from the terminal A (Step S505). Then, the management server 300 uses the electronic certificate information reception processing section 385 to decrypt the first electronic certificate with the replaced digital signature, and the replaced digital signature originally from the second electronic certificate and now included in the first electronic certificate, using a corresponding secret key stored in a customer master storage section 350 (Step S506).

Continuing, the management server 300 uses the electronic certificate information reception processing section 385 to determine (1) whether or not the decrypted first electronic certificate and the a first electronic certificate stored in the customer master storage section 350 correspond with each other, and (2) whether or not the decrypted digital signature of the second electronic certificate and the digital signature of the second electronic certificate stored in the customer master storage section 350 correspond with each other (Step S507). Also, the management server 300 uses the electronic certificate information reception processing section 385 to determine (3) whether or not a sender of the digital signature of the second electronic certificate is the terminal A (a terminal associated with the first electronic certificate) (Step S508).

Next, the management server 300 uses a remittance and payment receipt request reception processing section 387 to determine whether or not the amount of money to be received is within a balance of the user A's account, which balance is stored in an account data storage section 360 of the management server 300, more specifically, whether or not the amount of money to be received is within a balance of the account of the card number (account number) displayed on a display screen 130 of the terminal A (hereafter, referred to as an "account a") (Step S509).

If the amount of money to be received is determined to be within the balance of the account a in the above Step S509, the management server 300 uses a remittance and payment receipt processing section 388 to reduce by the amount of money to be received, the balance of account data of the account a of the user A, which balance is stored in the account data storage section 360, as well as to increase by the amount of money to be received, a balance of account data of the user B's account (hereafter, referred to as an "account b"), which balance is stored in the account data storage section 360 (Step S510).

Again in the present embodiment, the terminal A receives the digital signature from the terminal B, and therefore, receives at least part of the second electronic certificate from the terminal B. Thus, after the terminal A receives the digital signature from the terminal B, the management server 300 receives the digital signature of the terminal B, and determines whether or not the electronic certificate of the terminal A received from the terminal A and the digital signature of the terminal B correspond with information on the electronic certificates of the terminals A and B stored in the management server 300. In other words, since the terminal B's digital signature is sent from the terminal A to the management server 300, the two terminals which are about to perform a transaction are identified at this point, and the certificate information on both parties sent from the terminal A is cross-checked by the management server 300. Accordingly, the management server 300 may ensure the authentication of the terminals which are about to perform the electronic money remittance and payment receipt.

Here, the first electronic certificate of the terminal A is unique information that only the terminal A and the management server 300 comprise, and the second electronic certificate of the terminal B is unique information that only the terminal B and the management server 300 comprise. Also, at least part of the second electronic certificate is sent by the terminal A to the management server 300. Further, the management server 300 receives the certificate information of the both parties conducting the transaction from the terminal A to thereby authenticate the terminals which are about to perform the electronic money remittance and payment receipt. Thus, even if, for example, the terminal B obtains the terminal A's electronic certificate illegally to somehow tries to obtain electronic money the user A owns, the electronic money will never be sent from the user A to the user B unless the terminal A sends the management server 300 the certificate information of the both parties conducting the transaction.

Also, since the electronic money of each user is stored in the management server 300 in the present embodiment, even if, for example the terminal A is lost and may not be collected, the terminal loss alone does not result in a loss of the user A's electronic money.

Further, since the terminal A sends its electronic certificate to the terminal B, and sends instructions to send and receive electronic money in the present embodiment, the user A may send the electronic money directly to the user B while ensuring the safety of electronic money transfer. Thus, the electronic money may be transferred in a way extremely similar to that using cash.

It should be mentioned that the present invention is not limited to the above one embodiment, and that various changes and modifications may be made, without departing from the scope and spirit of the present invention.

Also needless to say, the present invention may be modified in various manners and is not limited to the above one embodiment, and various changes and modifications may be made without departing from the scope and spirit of the invention.

What is claimed is:

1. A method of transferring electronic money from a first user terminal (A) of a first user to a second user terminal (B) of a second user via an electronic money management server, the method comprising:

issuing, by the electronic money management server, first and second device-specific electronic certificates to the first user terminal and the second user terminal, respectively, wherein each of the electronic certificates comprise a digital signature;

sending, by the first user terminal to the money management server, an electronic money purchasing request comprising an electronic money amount and payment method;

processing, by the electronic money management server, the electronic money purchasing request by configuring an electronic money account number, storing account data including an amount balance, and sending to the first user terminal both the electronic money account number and the electronic money amount balance;

exchanging, by the first user terminal and the second user terminal, digital signatures via near field communication when the first and second user terminals are brought near each other;

generating, by the first user terminal, a first electronic certificate by replacing the digital signature of the first device-specific electronic certificate by the received digital signature of the second user terminal;

generating, by the second user terminal, a second electronic certificate by replacing the digital signature of the second device-specific electronic certificate by the received digital signature of the first user terminal;

receiving, by the electronic money management server, the first electronic certificate from the first user terminal and the second electronic certificate from the second user terminal;

authenticating, by the electronic money management server, the first and second user terminals, by decrypting the first and second electronic certificates, verifying that each digital signature matches the first and second user terminal digital signatures, and determining that each of the first and second electronic certificates was generated based on each device-specific electronic certificates issued by the electronic money management server;

sending, by the electronic money management server, determination results to each of the first and second user terminals;

sending, by each of the first and second user terminals, access key requests to the electronic money management server;

sending, by the electronic money management server, a first access key to the first user terminal and a second access key to the second terminal;

sending, by the first user terminal to the electronic money management server, an instruction to send money to the second user terminal, the instruction to send money comprising the first access key and the received electronic money account number;

sending, by the second user terminal to the electronic money management server, an instruction to receive money, the instruction to receive money comprising the second access key;

identifying, by the electronic money management server, a transfer amount from either the instruction to send money or the instruction to receive money;

determining, by the electronic money management server, the correspondence between the first and second access keys and whether the identified transfer amount is within the electronic money amount balance stored in the electronic money management server;

in response to determining that the access keys correspond to each other and that the first user's balance is sufficient, settling, by the electronic money management server, the transfer by reducing the identified amount from the electronic money amount balance of the first user's electronic money account number and by increasing the identified amount to a balance of a second user's electronic money account number.

2. The method of claim 1, wherein sending the determination results to each of the first and second user terminals further comprises notifying the first user terminal and the second user terminal after the authentication step that these terminals were successfully authenticated.

3. The method of claim 1, further comprising:
storing, by the electronic money management server, a secret key for each issued electronic certificate; and
wherein decrypting of the first and second electronic certificates further comprises decrypting the certificates using the secret keys of the first and second electronic certificates, respectively.

4. The method of claim 1, further comprising, after the settling step:
invalidating, by the electronic money management server, the access keys.

5. The method of claim 1, wherein the step of processing, by the electronic money management server, the electronic money purchasing request further comprises storing, by the electronic money management server, the generated electronic money account number in addition to other electronic money account numbers previously issued for the first user terminal.

6. The method of claim 1, wherein the step of determining that each of the first and second electronic certificates was generated based on each device-specific electronic certificates issued by the electronic money management server further comprises determining, by the electronic money management server, that the first and second electronic certificates comprise, in addition to the replaced digital signatures, unaltered information from the first and second device-specific electronic certificates, respectively.

7. The method of claim 1, wherein the instruction to send money comprises the amount to be transferred.

8. The method of claim 7, wherein the settling step further comprises:
determining, by the electronic money management server, that the identified amount is equal to the electronic money amount balance of the first user's electronic money account number; and
deleting, by the electronic money management server, the first user's electronic money account number after settling the transfer.

9. The method of claim 8, wherein:
processing the electronic money purchasing request further comprises sending, by the electronic money management server, an image of an electronic money card to the first user terminal;
after deleting the first user's electronic money account number, sending, by the electronic management server, the image, the first user's electronic money account number as the second user's electronic money account number and the transfer amount to the second user terminal; and
displaying, by the second user terminal, the image of the electronic money card, the second user's electronic money account number and the transfer amount.

10. The method of claim 7, further comprising, after the settling step:
transferring, by the first user terminal via near field communication, an image of the electronic money card to the second user terminal; and
displaying, by the second user terminal, the image of the electronic money card.

11. The method of claim 7, wherein the user terminals are brought near each other when the distance between the first user terminal and the second user terminal is less than or equal to 10 cm.

12. The method of claim 1, wherein the instruction to receive money comprises the amount to be transferred.

13. The method of claim 12, wherein the settling step further comprises:
generating, by the electronic money management server, the second user's electronic money account number prior to settling.

14. The method of claim 13, wherein generating, by the electronic money management server, the second user's electronic money account number comprises generating a zero account balance for the second user's electronic money account number.

15. The method of claim 12, further comprising:
before exchanging digital signatures, receiving, by the first user terminal, benefit information from the electronic money management server comprising a benefit offer including a benefit amount;
displaying, by the first user terminal, the received benefit offer;
receiving, by the electronic money management server from the first user terminal, a benefit-receiving intention comprising an intention to receive the benefit offer and first user information;
after settling, determining, by the electronic money management server, that the benefit offer qualifications are met by matching, by the electronic money management server, the first user information received in the benefit-receiving intention with the received electronic money account number; and determining that the identified amount is sufficient to comply with the benefit offer; and in response to the determination that the benefit offer qualifications are met, providing, by the electronic money management server, the benefit amount to the electronic money account of the first user.

16. The method of claim 15, wherein: providing the benefit comprises increasing, by the electronic money management server, the balance of the electronic money account of the first user by the monetary benefit.

* * * * *